United States Patent
Ota et al.

(10) Patent No.: US 6,687,209 B2
(45) Date of Patent: Feb. 3, 2004

(54) OPTICAL PICKUP APPARATUS, OBJECTIVE LENS, APPARATUS FOR REPRODUCING AND/OR RECORDING OPTICAL INFORMATION RECORDING MEDIUM

(75) Inventors: Kohei Ota, Hachioji (JP); Norikazu Arai, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 412 days.

(21) Appl. No.: 09/862,594

(22) Filed: May 23, 2001

(65) Prior Publication Data

US 2002/0003767 A1 Jan. 10, 2002

(30) Foreign Application Priority Data

May 24, 2000 (JP) .......................... 2000-153351
May 24, 2000 (JP) .......................... 2000-153352
Jan. 29, 2001 (JP) .......................... 2001-019502

(51) Int. Cl.$^7$ .............................. G11B 7/00; G02B 13/18
(52) U.S. Cl. .............................. 369/112.08; 369/112.25; 369/112.26; 359/719
(58) Field of Search ................. 369/112.08, 112.07, 369/112.01, 112.11, 112.12, 112.13, 112.23, 112.2, 112.25; 359/719, 565

(56) References Cited

U.S. PATENT DOCUMENTS 6,118,594 A * 9/2000 Maruyama ................. 359/719

FOREIGN PATENT DOCUMENTS

| JP | 10-283668 | 10/1998 |
|----|-----------|---------|
| JP | 11-096585 | 4/1999 |
| JP | 2000-081566 | 3/2000 |

* cited by examiner

Primary Examiner—Doris H. To
Assistant Examiner—Jorge L Ortiz Criado
(74) Attorney, Agent, or Firm—Finnegan, Henderson, Farabow, Garrett & Dunner, L.L.P.

(57) ABSTRACT

An optical pickup apparatus for at least two kinds of optical information recording media, comprises a first light source; a second light source; an optical converging system; and a photo detector. An optical element of the optical converging system comprises a first region including an optical axis and a second region adjoining the first region and locating at the outside of the first region, the first region is a refractive surface and the second region is a diffractive surface. When a first light flux passes through the second region, the light amount of n-th order diffracted ray of the first light flux is larger than that of any other order diffracted ray of the first light flux, and when a second light flux passes through the second region of the optical element, the light amount of n-th order diffracted ray of the second light flux is larger than that of any other order diffracted ray of the second light flux, where n is an integer except 0.

41 Claims, 12 Drawing Sheets

DVD SPHERICAL ABERRATION mm

CD SPHERICAL ABERRATION mm

DVD SPHERICAL ABERRATION mm

CD SPHERICAL ABERRATION mm

OPTICAL PICKUP APPARATUS, OBJECTIVE LENS, APPARATUS FOR REPRODUCING AND/OR RECORDING OPTICAL INFORMATION RECORDING MEDIUM

FIELD OF THE INVENTION

The present invention relates to an objective lens used for conducting recording and/or reproducing of an information recording medium in an optical pickup apparatus, and to an optical pickup apparatus.

BACKGROUND OF THE INVENTION

For an optical pickup apparatus capable of conducting recording and/or reproducing of information for a plurality of information recording media (for example, optical disks) each having different recording density and a different thickness of a transparent base board, such as CD and DVD, it has been demanded that downsizing and cost reduction of the apparatus are realized by using at least an objective lens in common, and various objective lenses and various optical pickup apparatuses for that demand have been suggested.

For example, there has been known an objective lens wherein ring-shaped notches are provided on one surface of the objective lens as specific ring-shaped zones to constitute the surface with a plurality of divided surfaces (for example, three divided surfaces), and a part (for example, a first divided surface closer to the optical axis) of the plural divided surfaces is made to be used for recording and/or reproducing of information for two types of information recording media each having different recording density and a different thickness of a transparent base board, a part (for example, a second divided surface that is adjacent to the first divided surface) of the remaining divided surfaces is made to be used for recording and/or reproducing of information for the information recording medium on one side (for example, the information recording medium having a smaller necessary numerical aperture), and the rest (for example, a third divided surface that is adjacent to the second divided surface) is made to be used for recording and/or reproducing of information for the information recording medium on the other side (for example, the information recording medium having a larger necessary numerical aperture). As an example of the foregoing, there may be given one described in TOKKAIHEI No. 11-96585. However, erroneous detection has sometimes been caused for focus signals on the objective lens on which ring-shaped notches are provided as stated above. For example, in the case of recording or reproducing of DVD through the second divided surface that is corrected in terms of spherical aberration for CD among three divided surfaces provided on one surface of the objective lens, a light flux which has passed through the second divided surface has sometimes been converged on a sensor through defocusing, to cause erroneous detection for focus signals.

In TOKKAIHEI No. 10-283668, there is described an optical pickup apparatus wherein a ring lens of a hologram type is used, and with regard to a hologram portion, light having a wavelength of 650 nm for DVD is used as zero-order light, while, with regard to light having a wavelength of 780 nm for CD, one-order diffracted light is used.

However, in the case of one wherein divided surfaces are provided on an objective lens as stated above, and one of the divided surfaces is made to be a hologram or a diffractive surface for which zero-order light is used for a wavelength on one side and primary light is used for a wavelength on the other side, the diffraction efficiency is lowered, and quantity of light coming from a light source cannot be utilized sufficiently, resulting in erroneous detection that is sometimes caused for focus signals.

In TOKKAI No. 2000-81566, there is described an objective lens wherein a diffractive structure is formed on a lens surface in a pattern of ring-shaped zones whose centers are on an optical axis, and the diffractive structure is made to have wavelength-dependency so that diffracted light with the same order number by at least two light fluxes each having a different wavelength may form an excellent wave front respectively for two types of optical disks each having a different thickness of a protective layer.

However, since the diffractive structure is formed on the objective lens equipped with diffractive structure on the entire surface of the lens surface as stated in the official gazette mentioned above so that the diffracted light with the same order number appropriate for light fluxes with at least two wavelengths may be obtained, there has been a problem that efficiency of the objective lens for using quantity of light from a light source is lower than that of an objective lens composed of a refraction surface on which no diffractive structure is provided. Further, since the number of diffractive ring-shaped zones is large, productivity for a metal mold for forming a lens is lowered, and production cost for a metal mold is enhanced, which has also been a problem. When recording information on an optical information recording medium, in particular, the recording requires greater quantity of light, compared with reproducing, and therefore, the problem of the fall of efficiency for using quantity of light is serious.

Further, when using a plastic lens, a change in aberration caused by temperature fluctuation has also been a problem.

SUMMARY OF THE INVENTION

In view of the problems in the prior art stated above, an object of the invention is to provide an optical pickup apparatus wherein quantity of light coming from a light source can be used fully, erroneous detection of light from an information recording medium is not caused, and an increase in production cost can be controlled, and to provide an objective lens to be used for the optical pickup apparatus. A further object is to provide an optical pickup apparatus capable of providing sufficient quantity of light when recording information on an optical information recording medium and to provide an objective lens to be used for the optical pickup apparatus stated above. Still another object is to provide an optical pickup apparatus that can control a change in aberration even when ambient temperature is changed, and to provide an objective lens to be used for the optical pickup apparatus mentioned above.

The objects stated above can be attained by the following structures.

(1) An optical pickup apparatus for conducting reproducing or recording information of at least two kinds of optical information recording media, comprises:

a first light source to emit first light flux having a first wavelength to conduct reproducing or recording information of a first optical information recording medium having a first transparent base board;

a second light source to emit second light flux having a second wavelength to conduct reproducing or recording information of a second optical information recording medium having a second transparent base board;

an optical converging system having at least one optical element; and a photo detector to receive and detect light transmitting through or reflecting from a first information recording surface of the first optical information recording medium or light transmitting through or reflecting from a second information recording surface of the second optical information recording medium;

wherein the first wavelength is different from the second wavelength and the thickness of the first transparent base board is different from that of the second transparent base board, wherein the optical element comprises a first region including an optical axis and a second region adjoining the first region and locating at the outside of the first region, the first region is a refractive surface and the second region is a diffractive surface, wherein when the first light flux passes through the second region of the optical element, the light amount of n-th order diffracted ray of the first light flux is larger than that of any other order diffracted ray of the first light flux, and when the second light flux passes through the second region of the optical element, the light amount of n-th order diffracted ray of the second light flux is larger than that of any other order diffracted ray of the second light flux, where n is an integer except 0, wherein the optical converging system converges the first light flux having passed through the first region and the n-th order diffracted ray of the first light flux having passed through the second region through the first transparent base board onto the first information recording surface so as to conduct reproducing or recording information of the first optical information recording medium, and the optical converging system converges the second light flux having passed through the first region through the second transparent base board onto the second information recording surface so as to conduct reproducing or recording information of the second optical information recording medium.

By virtue of the structure above, efficiency for using quantity of light is better than that in the occasion where the diffractive structure is provided on the entire surface, and it is possible to shorten man-hour for processing on a metal mold for forming a lens and to reduce production cost for the metal mold, because the number of diffractive ring-shaped zones is small. Further, erroneous detection of light from an information recording medium can also be prevented.

(2) In the optical pickup apparatus of (1), the optical element comprises a third region adjoining the second region and locating at the outside of the second region and the third region is a refractive surface, and the optical converging system converges the first light flux having passed through the first region, the n-th order diffracted ray of the first light flux having passed through the second region and the first light flux having passed through the third region through the first transparent base board onto the first information recording surface so as to conduct reproducing or recording information of the first optical information recording medium, and the optical converging system converges the second light flux having passed through the first region and the n-th order diffracted ray of the second light flux having passed through the second region through the second transparent base board onto the second information recording surface so as to conduct reproducing or recording information of the second optical information recording medium.

By virtue of the structure above, efficiency for using quantity of light is further improved by reducing an area of the diffraction portion more, and it is possible to shorten man-hour for processing on a metal mold for forming a lens and to reduce production cost for the metal mold, because the number of diffractive ring-shaped zones is small.

(3) In the optical pickup apparatus of (1), the optical element comprises a third region adjoining the second region and locating at the outside of the second region and the third region is a diffractive surface, wherein when the first light flux passes through the third region of the optical element, the light amount of m-th order diffracted ray of the first light flux is larger than that of any other order diffracted ray of the first light flux, and when the second light flux passes through the third region of the optical element, the light amount of m-th order diffracted ray of the second light flux is larger than that of any other order diffracted ray of the second light flux, where m is an integer except 0 and is equal to or different from n, and wherein the optical converging system converges the first light flux having passed through the first region, the n-th order diffracted ray of the first light flux having passed through the second region and the m-th order diffracted ray of the first light flux having passed through the third region through the first transparent base board onto the first information recording surface so as to conduct reproducing or recording information of the first optical information recording medium, and the optical converging system converges the second light flux having passed through the first region and the n-th order diffracted ray of the second light flux having passed through the second region hrough the second transparent base board onto the second information recording surface so as to conduct reproducing or recording information of the second optical information recording medium.

By virtue of the structure above, efficiency for using quantity of light is improved, production cost of a metal mold is reduced, and it is possible to control a change in aberration caused by temperature fluctuation. In addition, when conducting recording/reproducing of information on an optical information recording medium whose necessary numerical aperture is small, control of a light flux for making a light flux on the portion greater than the necessary numerical aperture to be a flare is more easy. Namely, flare control becomes easy. Thus, erroneous detection of light from an information recording medium can further be prevented.

(4) In the optical pickup apparatus of (1), the optical converging system comprises an objective lens and the second region extends to the maximum numerical aperture of the objective lens at an optical information recording medium side when the first light flux is used.

By virtue of the structure above, efficiency for using quantity of light is improved, production cost of a metal mold can be reduced, and control of a light flux for making a light flux on the portion greater than the necessary numerical aperture to be a flare is more easy when conducting recording/reproducing of information on an optical information recording medium whose necessary numerical aperture is small. Namely, flare control becomes easy. Thus, erroneous detection of light from an information recording medium can further be prevented.

(5) An objective lens for use in an optical pickup apparatus for conducting reproducing or recording information of at least two kinds of optical information recording media, comprises:

a first region including an optical axis; and a second region adjoining the first region and locating at the outside of the first region;

wherein the first region is a refractive surface and the second region is a diffractive surface, when a first light flux having a first wavelength to conduct reproducing or recording information of a first optical information recording medium having a first transparent base board passes through the second region of the objective lens, the light amount of n-th order diffracted ray of the first light flux is larger than that of any other order diffracted ray of the first light flux, and when a second light flux having a second wavelength to conduct reproducing or recording information of a second optical information recording medium passes through the second region of the optical element, the light amount of n-th order diffracted ray of the second light flux is larger than that of any other order diffracted ray of the second light flux, where n is an integer except 0, wherein the objective lens converges the first light flux having passed through the first region and the n-th order diffracted ray of the first light flux having passed through the second region through the first transparent base board onto a first information recording surface of the first optical information recording medium so as to conduct reproducing or recording information of the first optical information recording medium, and the objective lens converges the second light flux having passed through the first region through the second transparent base board onto a second information recording surface of the second optical information recording medium so as to conduct reproducing or recording information of the second optical information recording medium, and wherein the first wavelength is different from the second wavelength and the thickness of the first transparent base board is different from that of the second transparent base board.

By virtue of the structure above, efficiency for using quantity of light is better than that in the occasion where the diffractive structure is provided on the entire surface, and it is possible to shorten man-hour for processing on a metal mold for forming a lens and to reduce production cost for the metal mold, because the number of diffractive ring-shaped zones is small. Further, erroneous detection of light from an information recording medium can also be prevented.

(6) An optical information recording medium recording or reproducing apparatus for conducting reproducing recording information of at least two kinds of optical information recording media, comprising:

the optical pickup apparatus recited in (1).

By virtue of the structure above, efficiency for using quantity of light is better than that in the occasion where the diffractive structure is provided on the entire surface, and it is possible to shorten man-hour for processing on a metal mold for forming a lens and to reduce production cost for the metal mold, because the number of diffractive ring-shaped zones is small. Further, erroneous detection of light from an information recording medium can also be prevented.

In the embodiment of an objective lens used for an optical pickup apparatus in the invention, there is provided a lens surface that is equipped with areas each having no diffractive structure arranged on both sides of an area having thereon a diffractive structure in the direction toward the outside from the optical axis, and the diffractive structure is characterized to take a form that gives the same order number (excluding 0-order light) to light fluxes with at least two wavelengths ($\lambda 1$ and $\lambda 2$) wherein the order number of the diffracted light generates the maximum quantity of diffracted light. Here, "the same order number"" means that a number including a sign of "+" or "−" is the same. It may be preferable that the same order number is to be "+1". Incidentally, the condition that the sign of the diffraction order number is "+" means that the diffracted light ray is converged more than a zero order light ray.

The position where the area equipped with the above-mentioned diffractive structure is provided is determined by a wavelength of a light source used in an optical pickup apparatus that employs the objective lens stated above, a thickness of a transparent base board of an information recording medium, and density for recording information on the information recording medium, and is decided in accordance with the necessary numerical aperture of an objective lens determined for each of the information recording media.

For example, it is preferable that numerical apertures needed for objective lenses for reproducing or recording two information recording media in the optical pickup apparatus are different each other, and an area equipped with the diffractive structure is set in the vicinity of the smaller numerical aperture among the aforesaid numerical apertures. In virtue of the foregoing, it is possible to conduct light-converging for an appropriate spot diameter having the diffraction limit power for an information recording medium having a smaller necessary numerical aperture, and thereby to make the area that is not used usually for the information recording medium having a larger necessary numerical aperture, and might cause erroneous detection of focus signals by converging light through defocusing to be capable of contributing to image forming, on the contrary, and it is possible to make a loss of quantity of light to be less than the diffractive structure that causes the loss of quantity of light for the different wavelength, by providing areas each having no diffractive structure on areas by which the area having a diffractive structure is sandwiched. Therefore, it is possible to increase efficiency of using quantity of light from a light source that contributes to recording or reproducing of information, and to improve efficiency of an optical pickup apparatus by preventing erroneous detection of focus signals.

By providing areas each having no diffractive structure so that they sandwich the area having a diffractive structure as stated above, the efficiency of using quantity of light is improved more, compared with an occasion where diffractive structure is provided on the entire surface, thus, processing man-hour for a metal mold for forming lenses is shortened because the number of ring-shaped zones for diffraction is small, and fabrication cost for a metal mold can be reduced.

When an area that is not equipped with the diffractive structure is formed as a refraction surface on an area including an optical axis on the lens surface, the efficiency of using quantity of light is more improved.

An embodiment of the objective lens for the optical pickup apparatus in the invention is characterized in that the optical pickup apparatus has a first light source having a wavelength of $\lambda 1$ and a second light source having a wavelength of $\lambda 2$ ($\lambda 1 < \lambda 2$), the first light source emits a first light flux for reproducing or recording information for the first optical information recording medium having a transparent base board whose thickness is t1, the second light source emits a second light flux for reproducing or recording information for the second optical information recording medium having a transparent base board whose thickness is t2, the aforesaid objective lens has an area that is provided, on at least one surface, with diffractive structure that is rotation-symmetrical with respect to an optical axis, and the following expressions are satisfied when NA1 represents necessary numerical aperture of the objective lens on the optical information recording medium side that is needed for recording and/or reproducing the first optical information recording medium with the first light source, NA2 (NA2<NA1) represents necessary numerical aperture of the objective lens on the optical information recording medium side that is needed for recording and/or reproducing the second optical information recording medium with the second light source, the objective lens has on at least one surface thereof an area provided with a diffractive structure that is rotation-symmetrical with respect to an optical axis, N-th order diffracted light (N is an integer other than zero) coming from the area provided with the diffractive structure is utilized when recording and/or reproducing the first optical information recording medium with the first light source, M-th order diffracted light (M=N) coming from the area provided with the diffractive structure is utilized when recording and/or reproducing the second optical information recording medium with the second light source, and when N-th order diffracted light coming from the circumference of a circle that is farthest from an optical axis on the area provided with the diffractive structure among the light flux from the first light source is converted into the light flux whose numerical aperture on the optical information recording medium side is NAH1, while when N-th order diffracted light coming from the circumference of a circle that is closest to an optical axis on the area provided with the diffractive structure among the light flux from the first light source is converted into the light flux whose numerical aperture on the optical information recording medium side is NAL1.

NAH1<NA1

(1/3) NA2<NAL1<NA2

In the system using a light source having a wavelength of either one of 655±30 nm for DVD and using a light source having a wavelength of either one of 785±30 nm for DC in the optical pickup apparatus of a DVD/CD interchangeable type, 0.45<NAH1<0.56 and 0.3<NAL1<0.45 are preferable. The more preferable is that the position of an area provided with a diffractive structure is the numerical aperture 0.3–0.5 of the objective lens on the image side, and the still more preferable is that the position of an area provided with a diffractive structure is the numerical aperture 0.35–0.47 of the objective lens on the image side.

Further, 0.05<(NAH1−NAL1)<0.20 is preferable, and 0.07<(NAH1−NAL1)<0.13 is more preferable.

As a concrete design, for example, in an optical pickup apparatus in which DVD/CD are interchangeable, for DVD, a region up to a numerical aperture necessary for DVD except a region provided with a diffractive structure, that is, a central region and a peripheral region are shaped a spherical surface in which spherical aberration is corrected very well. On the other hand, in order to correct spherical aberration deteriorated due to the different thickness of the transparent base board of CD so as to conduct converging a beam having an appropriate spot diameter provided with a diffraction limitation performance, for CD in which the thickness of a transparent base board is different from that of DVD, a region in the vicinity of a numerical aperture necessary for CD, that is, a middle region is shaped a basic aspherical surface having a different aspherical surface from the spherical surface in which spherical aberration is corrected very well for DVD. Further, since the spherical aberration for DVD is deteriorated with only the basic spherical surface, a diffractive structure is provided to the region of the basic spherical surface. As a result, a first order diffracted ray from the region contributes to an image formation for DVD, thereby correcting the spherical aberration. The diffractive structure is designed such that the first order diffracted ray from the region contributes to an image formation for CD.

It is naturally possible to design an objective lens of the invention with various applications, without being limited to the design of this kind. Incidentally, the optical pickup apparatus of a DVD/CD interchangeable type is an optical pickup apparatus wherein at least one of information recording and information reproducing is possible for at least one type of DVD, and at least one of information recording and information reproducing is possible for at least one type of CD. CDs in various types include CD-R, CD-RW, CD-Video and CD-ROM, for example, and DVD includes, for example, DVD-ROM, DVD-RAM, DVD-R and DVD-RW.

Further, N equals 1, and it is preferable that primary diffracted light is used for both of the first and second information recording media.

In the boundary between the area provided with the diffractive structure and the area that is closest to an optical axis and is not provided with diffractive structure, it is preferable that a phase slip of a wavefront caused when light with the wavelength $\lambda 1$ is transmitted through a transparent base board having the thickness of t1 is not more than $\lambda 1/10$ when the first light source and the first optical information recording medium are used, and the more preferable is $\lambda 1/20$ or less.

Further, it is preferable that a step portion is provided on the circumference of a circle on the area provided with the diffractive structure closest to an optical axis, and a depth of the step portion is set so that a difference between optical paths caused by the step portion on the boundary with a refracting interface is almost integral multiples of $\lambda 1$ and $\lambda 2$, and due to this, a phase slip caused by the step portion can be made to be almost zero by each wavelength of $\lambda 1$ and $\lambda 2$.

To be concrete, it is possible to make the diffractive structure to be recessed from the refracting interface or to be protruded from the refracting interface in terms of a form so that a step portion is provided on the circumference of a circle on the area provided with the diffractive structure closest to an optical axis and a depth of the step portion is within a range of 4 μm–10 μm.

On the other hand, it is possible to make a step portion to be provided also on the circumference of a circle on the area provided with the diffractive structure farthest from an optical axis, and it is possible to make the refracting interface that is farther from an optical axis to be recessed from the diffractive structure or to be protruded from the diffractive structure, on the step portion. This structure can make deterioration of wavefront aberration in temperature fluctuation to be small. Namely, it is possible to arrange so that a step portion is provided in the direction of an optical axis at the boundary between an area having thereon the diffractive structure and an area that is farthest from an optical axis and has no diffractive structure, and this step portion has a step of 1 μm–10 μm in the direction of an optical axis. When the step portion is 1 μm or more, it is possible to enhance Strehl ratio on the second optical information recording medium (for example, CD) side, while, when it is 10 μm or less, temperature characteristics about wavefront aberration are not deteriorated. Incidentally, the step portion provided in the direction of an optical axis may also be provided to be aslant to the direction of an optical axis of course, and even in this case, the step in the direction of an optical axis has only to be 1 μm–10 μm. In particular, the step that is in parallel with the direction of an optical axis is preferable.

The preferable optical pickup apparatus of the invention is provided with a first light source that emits a first light flux having wavelength of λ1 for reproducing or recording of information for the first optical information recording medium with a transparent base board whose thickness is t1, a second light source that emits a second light flux having wavelength of λ2 (λ1<λ2) for reproducing or recording of information for the second optical information recording medium with a transparent base board whose thickness is t2, an optical detector that detects light from the first and second information recording media, and with an objective lens wherein there is provided, in the direction toward the outside from the optical axis side, a lens surface equipped thereon with areas each having no diffractive structure in which an area having a diffractive structure is interposed, and the diffractive structure is in a form which makes at least two light fluxes each having a different wavelength (λ1, λ2) generate the maximum amount of diffracted light to be of the same order number each other (excluding 0 order).

Another preferable optical pickup apparatus of the invention is characterized in that there are provided a first light source that emits a first light flux having wavelength of λ1 for reproducing or recording of information for the first optical information recording medium with a transparent base board whose thickness is t1, a second light source that emits a second light flux having wavelength of λ2 (λ1<λ2) for reproducing or recording of information for the second optical information recording medium with a transparent base board whose thickness is t2, an optical detector that detects light from the first and second information recording media, and an objective lens having on at least one surface thereof an area provided with diffractive structure that is rotation-symmetrical with respect to an optical axis, and the following expressions are satisfied when NA1 represents necessary numerical aperture of the objective lens on the optical information recording medium side that is needed for recording and/or reproducing the first optical information recording medium with the first light source, NA2 (NA2<NA1) represents necessary numerical aperture of the objective lens on the optical information recording medium side that is needed for recording and/or reproducing the second optical information recording medium with the second light source, N-th order diffracted light (N is an integer other than zero) coming from the area provided with the diffractive structure is utilized when recording and/or reproducing the first optical information recording medium with the first light source, M-th order diffracted light (M=N) coming from the area provided with the diffractive structure is utilized when recording and/or reproducing the second optical information recording medium with the second light source, and when N-th order diffracted light coming from the circumference of a circle that is farthest from an optical axis on the area provided with the diffractive structure among the light flux from the first light source is converted into the light flux whose numerical aperture on the optical information recording medium side is NAH1, while when N-th order diffracted light coming from the circumference of a circle that is closest to an optical axis on the area provided with the diffractive structure among the light fluxes from the first light source is converted into the light flux whose numerical aperture on the optical information recording medium side is NAL1.

NAH1<NA1

(1/3) NA2<NAL1<NA2

When the objective lens of the optical pickup apparatus stated above is represented by an objective lens having the characteristics mentioned above, the same effect can be obtained, which is preferable.

Another embodiment of the invention will be described as follows. An objective lens of the optical pickup apparatus of the invention is characterized in that there is provided a lens surface on which an area provided with diffractive structure is provided on the outer circumference of an area that is not provided with diffractive structure up to the outermost circumference, and an area representing at least a part of the diffractive structure is in a form which makes at least two light fluxes each having a different wavelength (λ1, λ2) generate the maximum amount of diffracted light to be of the same order number (excluding 0 order). Incidentally, "the same order number" means that the order number is the same, including positive and negative signs. Further, "the outermost circumference" means the effective optical diameter of the lens surface. In the optical pickup apparatus which is actually equipped with an objective lens, however, "the outermost circumference" means the actually effective optical diameter through which a light flux from a light source enters, because the diffractive structure does not always need to be provided on an area on the outer circumferential side through which the light flux from a light source never enters at all.

The position where the area equipped with the above-mentioned diffractive structure is provided is determined by a wavelength of a light source used in an optical pickup apparatus that employs the objective lens stated above, a thickness of a transparent base board of an information recording medium, and density for recording information on the information recording medium, and is decided in accordance with the necessary numerical aperture of an objective lens determined for each of the information recording media.

For example, it is preferable that numerical apertures needed for objective lenses for reproducing or recording two information recording media in the optical pickup apparatus are different each other, and an area equipped with the diffractive structure is set in the vicinity of the smaller numerical aperture among the aforesaid numerical apertures. In virtue of the foregoing, it is possible to conduct light-converging for an appropriate spot diameter having the diffraction limit power for an information recording medium having a smaller necessary numerical aperture, and thereby to make the area that is not used usually for the information recording medium having a larger necessary numerical aperture, and might cause erroneous detection of focus signals by converging light through defocusing to be capable of contributing to image forming, on the contrary. Due to this, it is possible to increase efficiency of using quantity of light from a light source that contributes to recording or reproducing of information, and to improve efficiency of an optical pickup apparatus by preventing erroneous detection of focus signals.

When an area that is not equipped with the diffractive structure is provided on the inner circumferential side of the area provided with a diffractive structure, the efficiency of using quantity of light is more improved, compared with the occasion where the diffractive structure is provided on the entire surface, and processing man-hour for a metal mold for forming lenses is shortened because the number of ring-shaped zones for diffraction is small, and fabrication cost for a metal mold can be reduced.

Further, it is preferable that the same order number stated above is one order. It is further preferable that the area provided with the diffractive structure is divided into an inner area and an outer area, and the inner area is made to be in a form which makes the same order number to be one order, and the outer area is made to be in a form which makes the same order number to be the order number of 2 order or more.

An embodiment of the objective lens for the optical pickup apparatus in the invention is characterized in that the optical pickup apparatus has a first light source having a wavelength of λ1 and a second light source having a wavelength of λ2 (λ1<λ2), the first light source emits a first light flux for reproducing or recording information for the first optical information recording medium having a transparent base board whose thickness is t1, the second light source emits a second light flux for reproducing or recording information for the second optical information recording medium having a transparent base board whose thickness is t2, the aforesaid objective lens has an area that is provided, on at least one surface, with diffractive structure that is rotation-symmetrical with respect to an optical axis, and the following expressions are satisfied when NA1 represents necessary numerical aperture of the objective lens on the optical information recording medium side that is needed for recording and/or reproducing the first optical information recording medium with the first light source, NA2 (NA2<NA1) represents necessary numerical aperture of the objective lens on the optical information recording medium side that is needed for recording and/or reproducing the second optical information recording medium with the second light source, the objective lens has on at least one surface thereof an area provided with a diffractive structure that is rotation-symmetrical with respect to an optical axis, N-th order diffracted light (N is an integer other than zero) coming from the area provided with the diffractive structure is utilized when recording and/or reproducing the first optical information recording medium with the first light source, M-th order diffracted light (M=N) coming from the area provided with the diffractive structure is utilized when recording and/or reproducing the second optical information recording medium with the second light source, and when the diffracted light with the order number generating the maximum amount of diffracted light coming from the circumference of a circle that is farthest from an optical axis on the area provided with the diffractive structure among the light flux from the first light source is converted into the light flux whose numerical aperture on the optical information recording medium side is NAH1, while when the diffracted light with the order number generating the maximum amount of diffracted light coming from the circumference of a circle that is closest to an optical axis on the area provided with the diffractive structure among the light flux from the first light source is converted into the light flux whose numerical aperture on the optical information recording medium side is NAL1.

NA1<NAH1

(1/3) NA2<NAL1<NA2

In the system using a light source having a wavelength of either one of 655±30 nm for DVD and using a light source having a wavelength of either one of 785±30 nm for DC in the optical pickup apparatus of a DVD/CD interchangeable type, 0.60≦NAH1 and 0.3≦NAL1 <0.45 are preferable.

In the range greater than the necessary numerical aperture NA2, it is preferable that spherical aberration for the second information recording medium is made to be flare. Due to this, it is possible to obtain an appropriate spot diameter for the second information recording medium side.

In the range greater than the necessary numerical aperture NA2, it is preferable that high-order diffracted light is used.

As a concrete design, in an optical pickup apparatus of a DVD/CD interchangeable type, an area equipped with a diffractive structure is provided on the numerical aperture smaller than the necessary numerical aperture for CD or more, and an area of the small numerical aperture or less is made to be a refracting interface that is not equipped with a diffractive structure. In the range from the small numerical aperture to the necessary numerical aperture for CD, spherical aberration is corrected for both DVD and CD, and for the necessary numerical aperture for CD or more, spherical aberration of DVD is corrected and is made to be flare so that a spot diameter may not be stopped down excessively for CD. Further, an area that is in the vicinity of the numerical aperture necessary for CD is made to be a basic aspheric surface in an aspheric surface shape that is different from an aspheric surface shape whose spherical aberration is corrected properly for DVD, then the diffractive structure is provided on that area against deterioration of spherical aberration caused for DVD under that basic aspheric surface alone, thus, a desired objective lens can be made by designing the diffractive structure so that the primary diffracted light by that area may contribute to image forming and spherical aberration may be corrected properly for DVD and primary diffracted light by that area may contribute to image forming. It is naturally possible to design an objective lens of the invention by various applications, without being limited to the aforesaid design. Incidentally, the optical pickup apparatus of a DVD/CD interchangeable type is an optical pickup apparatus wherein at least one of recording and reproducing of information is possible for at least one type of DVD, and at least one of recording and reproducing of information is possible for at least one type of CD. Various CDs include, for example, CD-R, CD-RW, CD-Video and CD-ROM, and DVDs include, for example, DVD-ROM, DVD-RAM, DVD-R and DVD-RW.

When an area provided with the diffractive structure is a diffractive surface having thereon ring-shaped zones for diffraction, and when φ (h) represents an optical path difference function of the diffractive surface (h represents a distance from an optical axis), it is possible to arrange so that dφ(h)/dh is discontinuous or is substantially discontinuous function at the position of prescribed distance h. In the optical pickup apparatus for recording and reproducing information by an objective lens provided with ring-shaped zones for diffraction for the first and second information recording media each having a different thickness of a transparent base board, if a light flux on the outer side of prescribed numerical aperture is made to be flare under the state of use wherein the numerical aperture is on the smaller side, a beam diameter is not stopped down excessively even when the aperture restriction for a smaller numerical aperture is not used, and thereby, it is possible to obtain a relatively large spot diameter.

In this case, it is preferable that the ring-shaped zone which is i-th position when counted in the direction from an optical axis toward peripheral portion on the diffractive surface satisfies the following expression;

1.2≦pi+1/pi≦10 wherein, pi represents a width in the direction perpendicular to an optical axis of the i-th ring-shaped zone for diffraction counted in the direction from an optical axis toward the peripheral portion.

The preferable embodiment of the optical pickup apparatus of the invention is provided with a first light source that emits a first light flux having wavelength of λ1 for reproducing or recording of information for the first optical information recording medium with a transparent base board whose thickness is t1, a second light source that emits a second light flux having wavelength of λ2 (λ1<λ2) for reproducing or recording of information for the second optical information recording medium with a transparent base board whose thickness is t2, an optical detector that detects light from the first and second information recording media, and with an objective lens wherein there is provided a lens surface on which an area provided with a diffractive structure is provided on the outer circumference side of the area provided with a diffractive structure up to the outermost portion, and at least a part of the area of the diffractive structure is in a form which makes at least two light fluxes each having a different wavelength (λ1, λ2) generate the maximum amount of diffracted light to be of the same order number (excluding 0 order).

Another preferable embodiment of the optical pickup apparatus in the invention is characterized in that there are provided a first light source for emitting a first light flux having wavelength of λ1 for reproducing or recording information for the first optical information recording medium whose transparent base board has a thickness of t1, a second light source for emitting a second light flux having wavelength of λ2 (λ1<λ2) for reproducing or recording information for the second optical information recording medium whose transparent base board has a thickness of t2, an optical detector that detects light from the first and second information recording media, and an objective lens wherein an area provided with a diffractive structure that is rotation-symmetrical with respect to an optical axis is provided on the outer circumference of an area provided with no diffractive structure up to the outermost portion on at least one surface of the objective lens, and the following expressions are satisfied when NA1 represents necessary numerical aperture of the objective lens on the optical information recording medium side that is needed for recording and/or reproducing the first optical information recording medium with the first light source, NA2 (NA2<NA1) represents necessary numerical aperture of the objective lens on the optical information recording medium side that is needed for recording and/or reproducing the second optical information recording medium with the second light source, the objective lens has on at least one surface thereof an area provided with a diffractive structure that is rotation-symmetrical with respect to an optical axis, N-th order diffracted light (N is an integer other than zero) coming from at least a part of the area provided with the diffractive structure is utilized when recording and/or reproducing the first optical information recording medium with the first light source, M-th order diffracted light (M=N) coming from at least a part of the area provided with the diffractive structure is utilized when recording and/or reproducing the second optical information recording medium with the second light source, and when the diffracted light with the order number generating the maximum amount of diffracted light coming from the circumference of a circle that is farthest from an optical axis on the area provided with the diffractive structure among the light fluxes from the first light source is converted into the light flux whose numerical aperture on the optical information recording medium side is NAH1, while when the diffracted light with the order number generating the maximum amount of diffracted light coming from the circumference of a circle that is closest to an optical axis on the area provided with the diffractive structure among the light fluxes from the first light source is converted into the light flux whose numerical aperture on the optical information recording medium side is NAL1.

NA1≦NAH1
(1/3) NA2<NAL1<NA2

Incidentally, in the invention, the first and second optical information recording media include, for example, various types of CD such as CD, CD-R, CD-RW, CD-Video and CD-ROM and various types of DVD such as DVD, DVD-ROM, DVD-RAM, DVD-R and DVD-RW, or a disk-shaped information recording medium such as MD, and further, high density information recording media wherein recording density has been enhanced are also included.

DETAILED DESCRIPTION OF THE INVENTION

Figure 1:
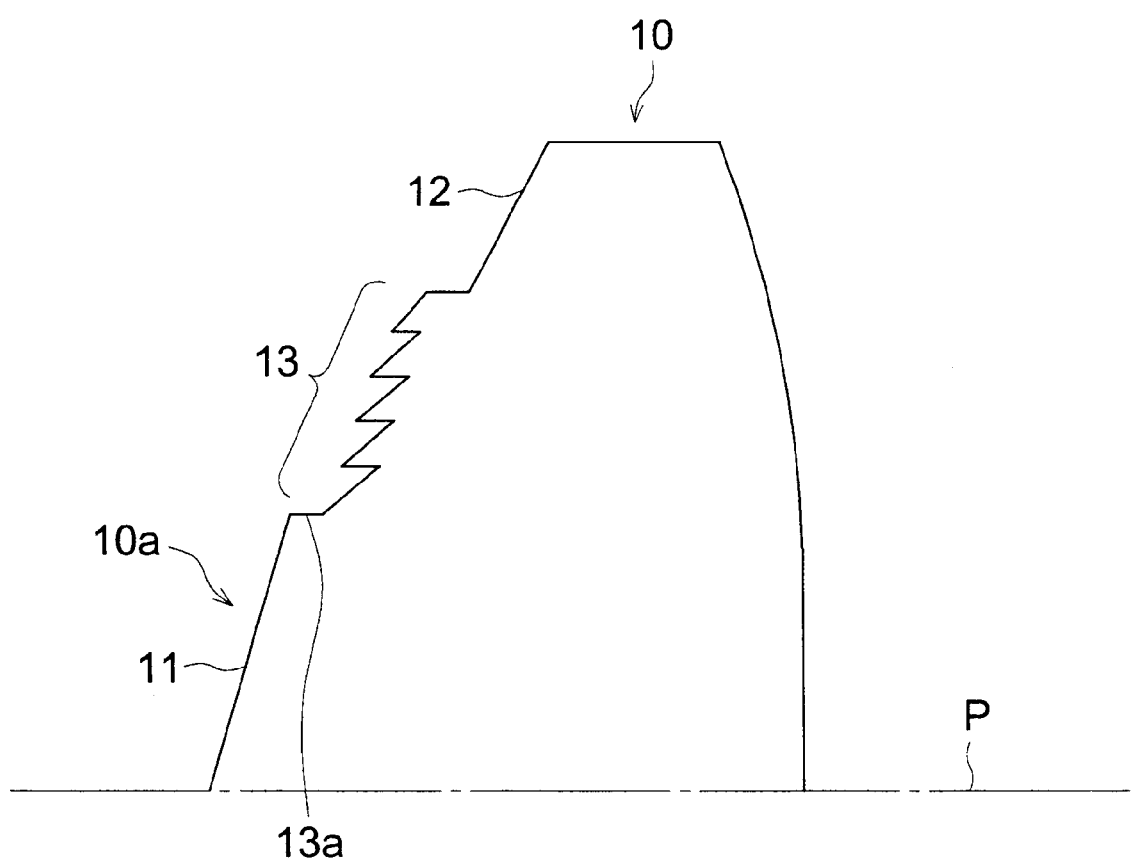
FIG. 1 is a sectional view of an illustrative upper half of an objective lens of the present embodiment.

Details of the invention will be explained as follows.

The optical pickup apparatus of the invention is one used for reproducing or recording information on at least two types of optical information recording media. The optical pickup apparatus of the invention has therein a first light source that emits a first light flux having a first wavelength for reproducing or recording information on a first optical information recording medium having a first transparent base board, a second light source that emits a second light flux having a second wavelength for reproducing or recording information on a second optical information recording medium having a second transparent base board, a light-converging optical system having at least one optical element, and an photo detector that detects by receiving light reflected on or transmitted through a first information recording surface of the first optical information recording medium or light reflected on or transmitted through a second information recording surface of the second optical information recording medium. Incidentally, the first wavelength is different from the second wavelength, and a thickness of the first transparent base board is different from that of the second transparent base board. It is preferable that a difference between the first wavelength and the second wavelength is not less than 80 nm. The more preferable is not less than 80 nm and not more than 400 nm. It is further preferable that a difference of a thickness between the first transparent base board and the second transparent base board is not less than 0.1 mm.

The optical element has a first area (region) including an optical axis and a second area (region) that is adjacent to the first area (region) and is located outside the first area (region), and the first area (region) is a refractive surface, while, the second area (region) is a diffractive surface. It is preferable that the first area and the second area are in the shape of concentric circles. It is preferable that the diffractive surface representing the second area is a ring-shaped diffractive surface having a plurality of ring-shaped zones, and the more preferable is a ring-shaped diffractive surface of a blazed type.

When the first light flux passes through the second area of the optical element, a quantity of light of n-th degree (order) diffracted light of the first light flux is greater than that of diffracted light of any other degree (order) number, while, when the second light flux passes through the second area of the optical element, a quantity of light of n-th degree (order) diffracted light of the second light flux is greater than that of diffracted light of any other degree (order) number. Incidentally, n is an integer having a sign other than zero.

The light-converging optical system converges the first light flux that has passed through the first area and the aforesaid n-th degree (order) diffracted light of the first light flux that has passed through the second area on the first information recording surface through the first transparent base board, so that information on the first optical information recording medium may be reproduced or recorded. Further, the light-converging optical system converges the second light flux that has passed through the first area on the second information recording surface through the second transparent base board, so that information on the second optical information recording medium may be reproduced or recorded.

Due to the structure of the invention, the efficiency of using quantity of light is improved more, compared with an occasion where diffractive structure is provided on the entire surface, further, processing man-hour for a metal mold for forming lenses is shortened because the number of ring-shaped zones for diffraction is small, and fabrication cost for a metal mold can be reduced. It is also possible to prevent erroneous detection for light coming from an information recording medium. In particular, the foregoing is appropriate when recording information on an optical information recording medium, because the efficiency of using quantity of light can be enhanced.

It is preferable that each of the first and second light sources is a laser light source. When the optical information recording medium is DVD, a wavelength of a light source preferably is 655±30 nm, while, when the optical information recording medium is CD, a wavelength of a light source preferably is 785±30 nm. The light-converging optical system is one for converging a light flux emitted from a light source on an information recording surface of an optical information recording medium, and it has at least one objective lens. The light-converging optical system may also have a collimator lens or a coupling lens. The photo detector preferably has a photoelectric converting element such as a photo-diode, CCD and CMOS.

Incidentally, it is preferable that the following conditional expressions are satisfied;

$\lambda 1 < \lambda 2$ $t1 < t2$ $NA2 < NA1$ wherein, each symbol represents as follows.

$\lambda 1$: First wavelength
$\lambda 2$: Second wavelength
$t1$: Thickness of first transparent base board
$t2$: Thickness of second transparent base board
NA1: Necessary numerical aperture of objective lens on the optical information recording medium side required for reproducing or recording first optical information recording medium with first light flux
NA2: Necessary numerical aperture of objective lens on the optical information recording medium side required for reproducing or recording second optical information recording medium with second light flux Incidentally, with regard to the necessary numerical aperture, a numerical aperture determined by a standard may be regarded as the necessary numerical aperture in a certain optical information recording medium.

When conducting recording and reproducing of information of an optical information recording medium of which necessary aperture is NA2 (NA1>NA2), it is preferable that spherical aberration at NA1 on an information recording surface is 20 $\mu$m in a direction of the optical axis or more and spherical aberration at NA2 on an information recording surface is 20 $\mu$m in a direction of the optical axis or less, for preventing erroneous detection of light from the optical information recording medium. More preferably, the spherical aberration on NA1 in a direction of the optical axis is 30 $\mu$m or more and the spherical aberration on NA2 in a direction of the optical axis is 20 $\mu$m or more. The more preferable is that spherical aberration at NA1 is 40 $\mu$m or more and the spherical aberration at NA2 is 8 $\mu$m to 20 $\mu$m. Further, it may be such that the spherical aberration on NA1 in a direction of the optical axis is 40 $\mu$m or more and the spherical aberration on NA2 in a direction of the optical axis is 2 $\mu$m or less.

The optical element having the first area and the second area is preferably a lens, and it is more preferable that it is an objective lens. The lens may be a glass lens, but a plastic lens is preferable because an effect of the invention is conspicuous.

Further, n=+1 is preferable.

Further, a step portion having thereon stepped surface that is in parallel with an optical axis may be provided on a boundary between the first area and the second area. The first area may either be protruded or be recessed from the second area with the step portion serving as a boundary.

When providing a step portion on the boundary between the first area and the second area, a length of the stepped surface in the direction of an optical axis is preferably 4–10 $\mu$m. It is preferable that a length of the stepped surface in the direction of an optical axis is established so that a difference of optical paths caused on a boundary between the step portion and the first area may satisfy the following conditional expressions. Due to this arrangement, a phase slip caused by a step portion for each wavelength can be made almost zero, which is preferable;

$a\lambda 1 - 0.2\lambda 1 \leq \Delta L \leq a\lambda 1 + 0.2\lambda 1$ $b\lambda 2 - 0.2\lambda 2 \leq \Delta L \leq b\lambda 2 + 0.2\lambda 2$ wherein, each symbol represents as follows.

$\Delta L$: Optical path difference caused by the step portion on boundary between first area and second area
a: Integer
b: Integer
$\lambda 1$: The first wavelength
$\lambda 2$: The second wavelength The more preferable is that the following conditional expressions are satisfied.

$a\lambda 1 - 0.1\lambda 1 \leq \Delta L \leq a\lambda 1 + 0.1\lambda 1$ $b\lambda 1 - 0.2\lambda 2 \leq \Delta L \leq b\lambda 2 + 0.1\lambda 2$ It is preferable that a phase slip of wavefront on the first information recording surface with respect to the first light flux that has passed through a boundary between the first area and the second area is not more than $(1/10)\lambda 1$. ($\lambda 1$ is the first wavelength) The more preferable is $(1/20)\lambda 1$ or less.

Next, the preferable first embodiment of the invention will be explained as follows. In the present embodiment, the optical element has a third area (region) that is adjacent to the second area and is located outside the second area, and the third area is a refractive surface. The light-converging optical system converges the first light flux that has passed through the first area, n-th degree (order) diffracted light of the first light flux that has passed the second area, and the first light flux that has passed through the third area, on the first information recording surface through the first transparent base board, so that information on the first optical information recording medium may be reproduced or recorded. Further, the light-converging optical system converges the second light flux that has passed through the first area and n-th degree diffracted light of the second light flux that has passed through the second area on the second information recording surface through the second transparent base board, so that information on the second optical information recording medium may be reproduced or recorded.

It is preferable that the third area is in the form of the concentric circle with the first area and the second area. It is further preferable that the following conditional expressions are satisfied;

NA2<NA1
NAH1<NA1
(1/3)NA2<NAL1<NA2 wherein, each symbol represents as follows.

NAH1: Numerical aperture of the objective lens on the optical information recording medium side for the first light flux that has passed the position on the second area farthest from an optical axis NAL1: Numerical aperture of the objective lens on the optical information recording medium side for the first light flux that has passed the position on the second area closest to an optical axis In the optical element, when an area of the refractive surface is too large, it is difficult to form a spot which is excellent for both of two types recording media, resulting in a fall of efficiency for using light. Even when an area of the diffractive surface is too large, efficiency for using light falls. It is possible to enhance efficiency for using light extremely by satisfying the aforesaid conditional expressions.

For enhancing efficiency for using light, it is more preferable to satisfy the following conditional expressions.

NAH1<(9/10)NA1
(1/2)NA2<NAL1<NA2

In the case of the optical pickup apparatus of a DVD/CD interchangeable type, in particular, it is preferable to satisfy the following conditional expressions.

$0.45 \leq NAH1 \leq 0.56$
$0.3 \leq NAL1 \leq 0.45$

The following is more preferable.

$0.45 \leq NAH1 \leq 0.50$
$0.3 \leq NAL1 \leq 0.40$

Further, $0.05 \leq (NAH1-NAL1) \leq 0.20$ is preferable. The more preferable is $0.07 \leq (NAH1-NAL1) \leq 0.13$.

In the first embodiment, it is preferable that total of wavefront aberration of the first light flux that has passed through the first area, n-th degree diffracted light of the first light flux that has passed the second area and the first light flux that has passed through the third area is not more than 0.07 $\lambda$ rms (the more preferable is 0.05 $\lambda$ rms) on the first information recording surface, and total of wavefront aberration of the second light flux that has passed through the first area and n-th degree diffracted light of the second light flux that has passed through the second area is not more than 0.07 $\lambda$ rms on the second information recording surface. It is more preferable that total of wavefront aberration of the second light flux that has passed through the first area and n-th degree diffracted light of the second light flux that has passed through the second area and the second light flux that has passed through the third area is greater than 0.07 $\lambda$ rms on the second information recording surface. The more preferable is 0.1 $\lambda$ rms or more, and still more preferable is 0.2 $\lambda$ rms or more.

Further, a step portion having thereon a stepped surface that is in parallel, or is almost in parallel with an optical axis may be provided on a boundary between the second area and the third area. The second area may either be protruded or be recessed from the third area with the step portion serving as a boundary. Due to this structure, deterioration of wavefront aberration in temperature change can be made small. A length of the stepped surface in the direction of an optical axis that is 1–10 $\mu$m is preferable.

In the structure of the first embodiment stated above, the efficiency of using quantity of light is improved more by reducing the area of a diffraction section, processing man-hour for a metal mold for forming lenses is shortened because the number of diffractive ring-shaped zones is small, and fabrication cost for a metal mold can be reduced. Further, erroneous detection of light coming from an information recording medium can be prevented.

Next, a preferable second embodiment will be explained as follows. In the present embodiment, the optical element has a third area that is adjacent to the second area and is located outside the second area, and the third area is a diffractive surface. When the first light flux passes through the third area of the optical element, quantity of light of m-th degree diffracted light of the first light flux is greater than that of diffracted light of any other degree number, while, when the second light flux passes through the third area of the optical element, a quantity of light of m-th degree diffracted light of the second light flux is greater than that of diffracted light of any other degree number of the second light flux. Incidentally, m is an integer other than 0, and m can either be the same as n or be different from n. The light-converging optical system converges the first light flux that has passed through the first area, n-th degree diffracted light of the first light flux that has passed the second area, and m-th degree diffracted light of the first light flux that has passed through the third area, on the first information recording surface through the first transparent base board, so that information on the first optical information recording medium may be reproduced or recorded. Further, the light-converging optical system converges the second light flux that has passed through the first area and n-th degree diffracted light of the second light flux that has passed through the second area on the second information recording surface through the second transparent base board, so that information on the second optical information recording medium may be reproduced or recorded.

It is preferable that the third area is in the form of the concentric circle with the first area and the second area.

It is preferable that the diffractive surface representing the third area is a ring-shaped diffractive surface having a plurality of ring-shaped zones, and the more preferable is a ring-shaped diffractive surface of a blazed type. It is further preferable that a form of the diffractive surface of the second area is different from that of the diffractive surface of the third area.

In the second embodiment, it is preferable to satisfy the following conditional expressions.

NA2<NA1

NA1<NAH1

(1/3)NA2<NAL1<NA2

NAH11: Numerical aperture of objective lens on the optical information recording medium side for the first light flux that has passed through the position on the third area farthest from an optical axis In the optical element, when an area of the refractive surface is too large, it is difficult to form a spot which is excellent for both of two types recording media, resulting in a fall of efficiency for using light. Even when an area of the diffractive surface is too large, efficiency for using light falls. It is possible to enhance efficiency for using light extremely by satisfying the aforesaid conditional expressions.

The more preferable is to satisfy the following conditional expressions.

NA1≦NAH11

(1/2)NA2<NAL1<NA2

In the case of the optical pickup apparatus of a DVD/CD interchangeable type, in particular, it is preferable to satisfy the following conditional expressions.

0.60≦NAH11

0.3≦NAL1≦0.45

With respect to the boundary between the second area and the third area, it is preferable to satisfy the following conditional expression.

NAH1<NA1

NAH1: Numerical aperture of objective lens on the optical information recording medium side for the first light flux that has passed through the position on the second area farthest from an optical axis The more preferable is to satisfy the following conditional expressions.

NAH1<(9/10)NA1

(1/2)NA2<NAL1<NA2

In the case of the optical pickup apparatus of a DVD/CD interchangeable type, in particular, it is preferable to satisfy the following conditional expression.

0.45≦NAH1≦0.56

In the second embodiment, it is preferable that total of wavefront aberration of the first light flux that has passed through the first area, n-th degree diffracted light of the first light flux that has passed through the second area and m-th degree diffracted light of the first light flux that has passed through the third area is not more than 0.07 λ rms (the more preferable is 0.05 λ rms) on the first information recording surface, and total of wavefront aberration of the second light flux that has passed through the first area and n-th degree diffracted light of the second light flux that has passed through the second area is not more than 0.07 λ rms on the second information recording surface. It is more preferable that total of wavefront aberration of the second light flux that has passed through the first area and n-th degree diffracted light of the second light flux that has passed through the second area and m-th degree diffracted light of the second light flux that has passed through the third area is greater than 0.07 λ rms on the second information recording surface. The more preferable is 0.1 λ rms or more, and still more preferable is 0.2 λ rms or more.

Further, n≠m is preferable, and the more preferable is n<m and still more preferable is to satisfy the following conditional expressions.

n=+1 m≧+2

Still more preferable is n=+1 and m=+2.

In the second embodiment, it is preferable that $d\phi(h)/dh$ is discontinuous function or is substantially discontinuous function at the position of prescribed distance h', when $\phi(h)$ (h represents a distance from an optical axis) represents an optical path difference function for the second area and the third area both representing a diffractive surface. The more preferable is that $d\phi(h)/dh$ stated above is discontinuous or is substantially discontinuous on the boundary between the second area and the third area. In other words, it is preferable that a pitch of diffraction changes discontinuously on the boundary between the second area and the third area.

Further, it is preferable that each of the second area and the third area has a plurality of diffractive ring-shaped zones both being a diffractive surface, and the diffractive ring-shaped zone which is in the i-th position when counted in the direction from an optical axis toward peripheral portion satisfies the following expression;

$1.2 \leq p_{i+1}/p_i \leq 10$ wherein, $p_i$ represents a width in the direction perpendicular to an optical axis of the diffractive ring-shaped zone that is in the i-th position when counted in the direction from an optical axis toward the peripheral portion.

It may be more preferable that the following conditional formula is satisfied:

$1.2 \leq (P_{i+1}/m)/(P_{i/n}) \leq 10$

By satisfying the above conditional formula, the aberration change due to the temperature change can be suppressed more.

Further, in the second embodiment, when recording/reproducing is conducted for the second optical information recording medium with the second light flux, and when a doughnut-shaped spot is formed on the second information recording surface by a m-th degree diffracted ray of the second light flux that has passed the third area, it may be preferable that the doughnut-shaped spot satisfies the following condition: the inside diameter of the doughnut-shaped spot is 5 μm to 20 μm, the outer diameter of the doughnut-shaped spot is 35 μm to 80 μm, and a difference between the outer diameter and the inside diameter is not smaller than 30 μm.

The structure of the second embodiment stated above makes it possible to improve the efficiency of using a quantity of light, to reduce fabrication cost of a metal mold, and to control fluctuation of aberration caused by temperature changes. That is, the second embodiment make it possible to make a diffractive surface of the second area to face the inside of necessary numerical aperture of the optical information recording medium whose necessary numerical aperture is small, and to make a diffractive surface of the third area to face the outside thereof. Thus, if both of the diffractive surfaces of the second and third areas are made to have a function to converge a light flux, an effect to compensate aberration changes in fluctuation of temperature can be obtained. For example, when an ambient temperature rises, a fall of a refractive index of a plastic objective lens makes spherical aberration to be over. However, an oscillated wavelength of a laser is made to be long, and thereby, a converging action caused by a diffractive structure is changed to be strong, which makes spherical aberration to be under, corresponding to the extent of the change to be strong, thus, the over spherical aberration mentioned above can be offset by the under spherical aberration. Further, by making the third area to be a diffractive surface, control of a light flux for making a light flux on the portion that is larger than the necessary numerical aperture to be flare becomes more easy, when recording or reproducing information on an optical information recording medium whose necessary numerical aperture is smaller. Namely, the flare control turns out to be easy, which makes erroneous detection of light coming from an information recording medium to be prevented.

Further, in order to make the temperature characteristic well, when the temperature change of the first light source is 0.2 nm/deg in the second embodiment, it may preferable to satisfy the following conditional formula:

$$0.009 \leq \Delta W \cdot f/(NA1 \cdot (1-m))^4 \leq 0.027$$

where f is a focal length with the first light flux, m is an image forming magnification with the first light flux and $\Delta W$ is a temperature change (rms) of the wavefront aberration on the first optical information recording medium.

Incidentally, in the first embodiment and the second embodiment, a fourth area may further be provided outside the third area, and even a fifth area may further be provided. The fourth area and the fifth area may be either a refractive surface or a diffractive surface.

Next, the third embodiment of the invention which is preferable will be explained as follows. In the present embodiment, the second area of the optical element is extended up to the maximum numerical aperture of the objective lens on the optical information recording medium side in the optical pickup apparatus wherein the first light flux is used. In other words, it can be said that the second area is extended up to the outermost circumference of the effective diameter of an optical surface. Namely, in the third embodiment, third area is not provided outside the second area, which is different from the first embodiment and the second embodiment.

It is preferable that the following expressions are satisfied.

$NA2 < NA1$
$NA1 \leq NAH1$
$(2/3)NA2 < NAL1 < NA1$

In the optical element, when an area of a refractive surface is too large, it is difficult to form a spot which is excellent for both two types of recording media, resulting in a fall of efficiency for using light. Even when an area of a diffractive surface is too large, the efficiency for using light falls. It is possible to enhance efficiency for using light extremely by satisfying the aforesaid conditional expressions.

It is more preferable that the following expressions are satisfied.

$NA1 \leq NAH1$
$(4/5)NA2 < NAL1 < (6/5)NA2$

In the case of the optical pickup apparatus of a DVD/CD interchangeable type, in particular, it is preferable to satisfy the following conditional expressions.

$0.60 \leq NAH1$
$0.40 < NAL1 < 0.55$

More preferably, $0.40 < NAL1 < 0.50$

In the third embodiment, it is preferable that total of wavefront aberration of the first light flux that has passed through the first area and n-th degree diffracted light of the first light flux that has passed through the second area is not more than $0.07 \lambda$ rms (the more preferable is $0.05 \lambda$ rms) on the first information recording surface, and total of wavefront aberration of the second light flux that has passed through the first area is not more than $0.07 \lambda$ rms on the second information recording surface. It is more preferable that total of wavefront aberration of the second light flux that has passed through the first area and n-th degree diffracted light of the second light flux that has passed through the second area is greater than $0.07 \lambda$ rms on the second information recording surface. The more preferable is $0.1 \lambda$ rms or more, and still more preferable is $0.2 \lambda$ rms or more.

The structure of the third embodiment stated above makes it possible to improve the efficiency of using a quantity of light, to reduce fabrication cost of a metal mold, and to realize easy control of a light flux for making a light flux on the portion that is larger than the necessary numerical aperture to be flare when recording or reproducing information on an optical information recording medium whose necessary numerical aperture is smaller. Namely, the flare control turns out to be easy, which makes erroneous detection of light coming from an information recording medium to be prevented.

An apparatus for recording and/or reproducing an optical information recording medium of the invention is used for reproducing and/or recording information on at least two types of optical information recording media, and has an optical pickup apparatus of the invention. It preferably is equipped with a spindle motor and a power source for rotating an optical information recording medium.

An embodiment of the invention will be explained as follows, referring to the drawings. FIG. 1 is a sectional view of an illustrative upper half of an objective lens used for an optical pickup apparatus showing configuration of the first embodiment of the invention. As shown in FIG. 1, in objective lens 10, there are provided, on first surface 10a, refracting interface 11 representing the first area that is close to optical axis p, diffractive ring-shaped zone 13 representing the second area that is provided rotation-symmetrically on an outer circumferential area of the refracting interface 11 that is away from an optical axis p and refracting interface 12 representing the third area that is provided outside the outer circumference of diffractive ring-shaped zone 13.

The diffractive ring-shaped zone 13 is provided within a range from numerical aperture NAL1 to NAH1, and it corrects spherical aberration by utilizing a difference of wavelengths of light sources for two types of optical information recording media each having a transparent base board having a different thickness.

As an example, diffractive ring-shaped zone 13 is provided within a range from NA 0.37 to NA 0.50 on the first surface 10a of objective lens 10, when coping with both DVD having necessary numerical aperture of 0.6 for wavelength of 655 nm and CD having necessary numerical aperture of 0.5 for wavelength of 785 nm.

On refracting interface 11 with NA 0.37 or less, there is no loss caused by diffraction efficiency, and 100% of a quantity of light can be used. In a range where NA is as small as 0.37, an influence on a spot diameter that is necessary for image forming power and on wavefront aberration is small even when spherical aberration is not corrected perfectly, a large quantity of light enhances accuracy of recording and reproducing, and erroneous detection of focus signals can be prevented.

When objective lenses are manufactured through injection molding on a mass production basis, if the production is large, the number of metal molds required is large and processing man-hour for them is increased, and in the case of a diffraction lens, in particular, the processing of metal mold corresponding to the diffractive ring-shaped zones is time-consuming. However, it is possible for the structure of an intermediate diffractive ring-shaped zones to reduce cost of metal molds and thereby to lower the fabrication cost, because the number of ring-shaped zones in the intermediate diffractive ring-shaped zones is less than that in the structure of entire diffractive surface, and thereby processing man-hour can be shortened.

Figure 9:
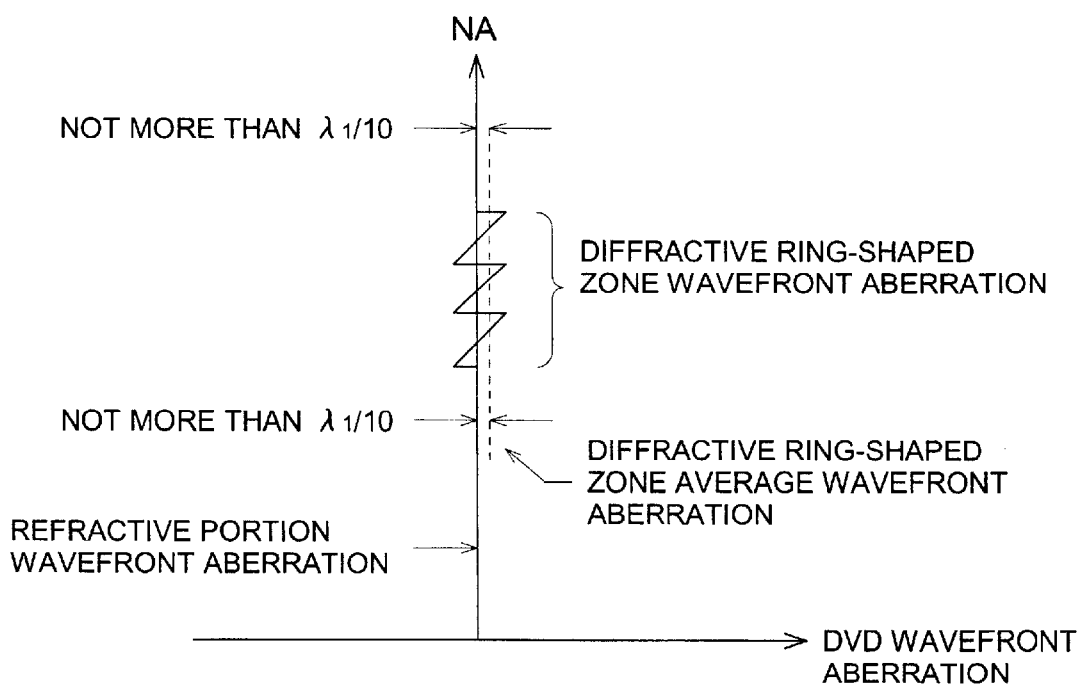
FIG. 9 is a diagram showing illustratively spherical aberration for DVD relating to the objective lens shown in FIG. 1.

It is preferable that a phase slip of wavefront wherein a light source with wavelength of $\lambda 1$ and DVD (transparent base board thickness t1) are used, and light with wavelength λ1 is transmitted through a transparent base board having a thickness of t1 is λ1/10 or less on the boundary between diffractive ring-shaped zones 13 and refracting interface 11 on the optical axis p side, and it is more preferable that the phase slip is λ1/20 or less. Concretely, when forming diffractive ring-shaped zones on an objective lens based on lens data such as those in the example which will be stated later, the foregoing can be realized by adjusting the position of the diffractive ring-shaped zones 13 in the direction of optical axis p delicately and by determining it, so that a phase difference between the diffractive ring-shaped zones 13 and refracting interface 11 may be almost zero on DVD. Namely, though a wavefront difference is caused on the diffractive ring-shaped zones 13 by a difference between blazed wavelength and wavelength (λ1) used as shown in FIG. 9, the position of the diffractive ring-shaped zones 13 in the direction of optical axis p may be determined so that an average wavefront of the diffractive ring-shaped zones 13 may not cause a phase slip with wavefront of refracting interface 12. An adjustment is made so that average wavefront aberration of the diffractive ring-shaped zone may be λ1/10 or less for wavefront aberration of a refracting portion (refracting interface) as shown in FIG. 9.

Figure 2:
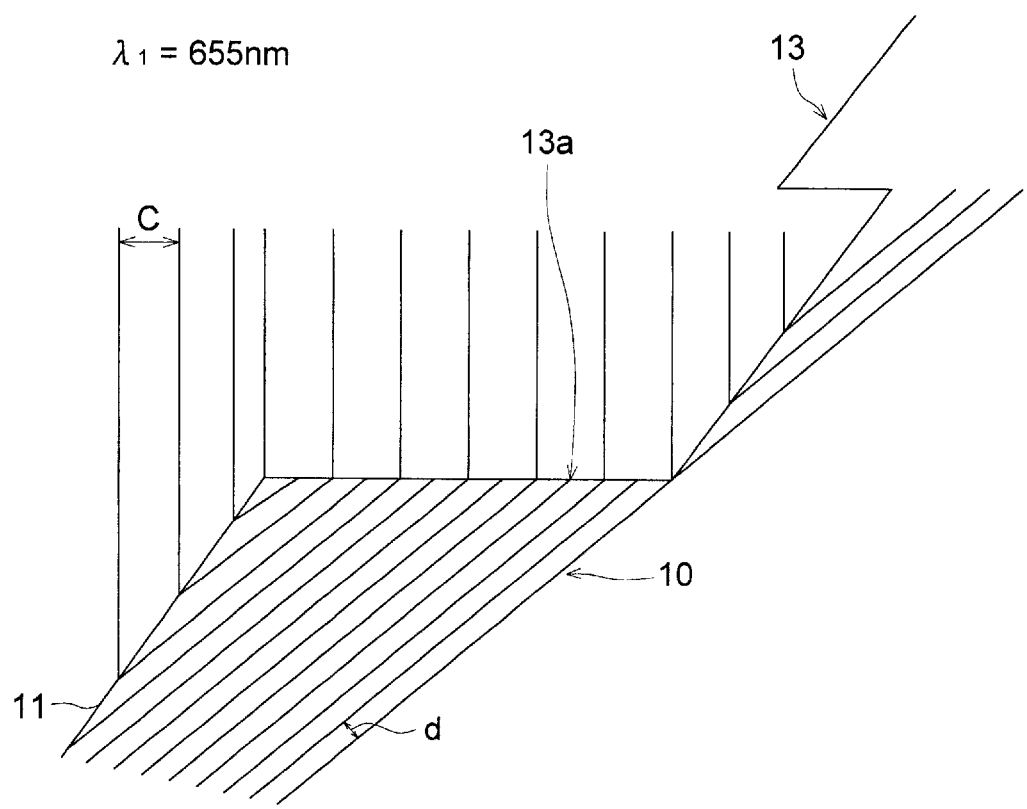
FIG. 2 is a sectional view wherein primary portions in FIG. 1 are enlarged.

Next, step portion 13a of the boundary between refracting interface 11 and diffractive ring-shaped zone 13 will be explained as follows, referring to FIG. 2. The dimension (depth) of the step portion 13a is established so that a difference of optical paths caused on the refracting interface and boundary by the step portion 13a may be integral multiples of λ1 and λ2. Namely, if the depth of the step portion 13a is determined so that an optical path difference of 6λ1 may be caused as shown in FIG. 2 when a light flux whose wavelength λ1 is 655 nm enters objective lens through its first surface 10a, an optical path difference that is almost 5λ2 for wavelength λ2 is caused when wavefront λ2 is 785 nm, because λ1:λ2 is almost 5:6, thus, neither λ1 nor λ2 causes a phase difference. Further, by setting a dimension (depth) of step portion 13a appropriately, deterioration of wavefront aberration caused by temperature change can be made small. Namely, a depth of the step portion 13a is preferably 4 μm–10 μm.

Figure 6:
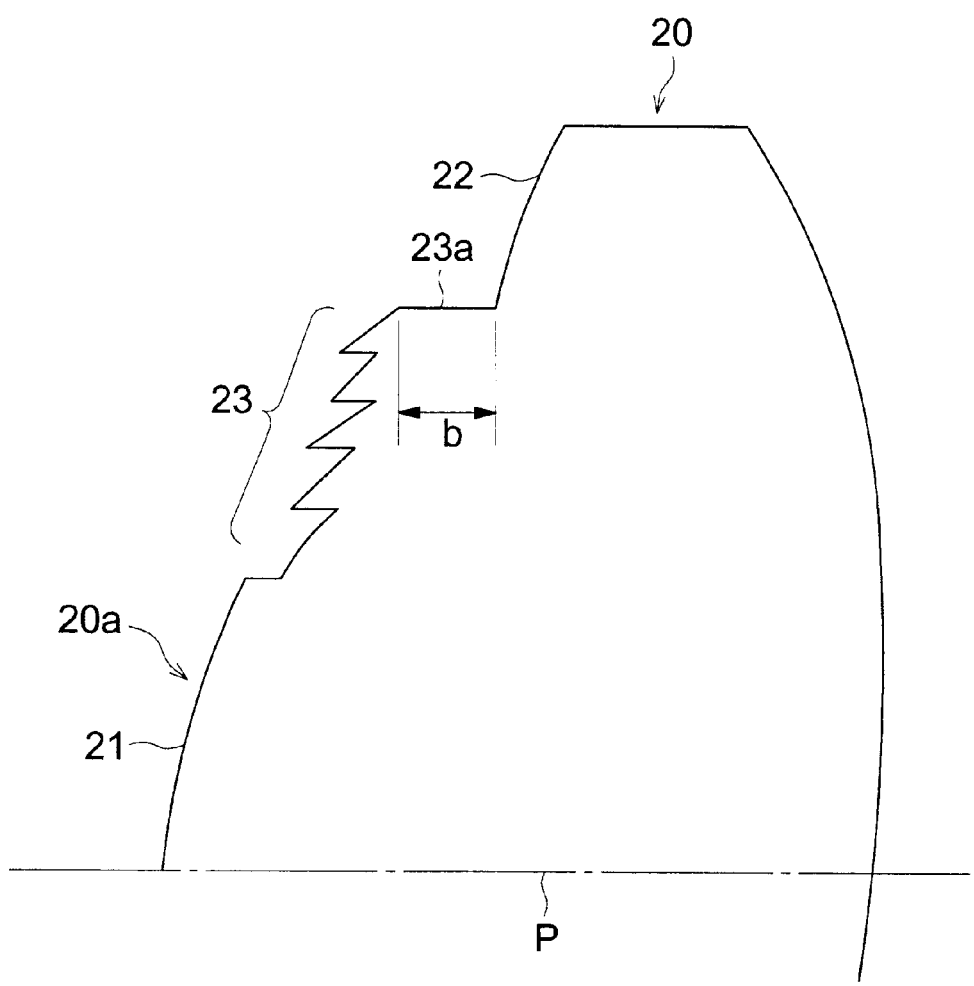
FIG. 6 is a sectional view of an illustrative upper half of another objective lens of the present embodiment.

Next, an objective lens used for another optical pickup apparatus of the first embodiment will be explained as follows, referring to FIG. 6. FIG. 6 is a sectional view of an illustrative upper half of an objective lens used for an optical pickup apparatus showing configuration of the second embodiment of the invention.

As shown in FIG. 6, in objective lens 20, there are provided, on first surface 20a, refracting interface 21 representing the first area that is close to optical axis p, diffractive ring-shaped zone 23 representing the second area that is provided rotation-symmetrically on an outer circumferential area of the refracting interface 21 that is away from an optical axis p and refracting interface 22 representing the third area that is provided outside the outer circumference of diffractive ring-shaped zone 23, and the objective lens can be used in the same way as in the objective lens shown in FIG. 1. On the objective lens 20, there is provided step portion 23a in a way that it has a stepped surface in the direction of optical axis p on the boundary between diffractive ring-shaped zone (second area) 23 that is on the side being away from optical axis p and refracting interface (third area) 22 for the basic aspheric surface of the diffractive ring-shaped zone 23.

By providing the step portion 23a to be in an appropriate length in the direction of an optical axis, Strehl ratio on the CD side can be enhanced. For example, the diffractive surface is provided on a side of the lens to which light flux comes in, a height of the step portion 23a is made to be a value which is almost expressed by the following expression, so that an optical path difference caused by the step for wavelength λ1 of DVD may be integral multiples of a wavelength;

m·λ1/(cosθ−n·cosθ')

(wherein, m is an integer, θ represents an inclination angle of an incident light, θ' represents an inclination angle of emerging light, and n represents a refractive index.)

Though spherical aberration is caused on the CD side so that a light flux passing through refracting interface 22 that is on the outer side of diffractive ring-shaped zones may be a flare, it has been found that a portion of the flare has an influence on Strehl ratio of an image forming spot for CD. Namely, when a height of the step portion is changed so that a value of integer m in the aforesaid expression may take a different integer value, a phase changes by integral multiples of wavelength λ1 on the boundary between diffractive ring-shaped zones 23 and refracting interface 22 for wavelength λ1 of DVD, and Strehl ratio remains unchanged. On the other hand, a fraction from integral multiples of λ2 is caused in the phase change on the boundary, for wavelength λ2 of CD, and at this time, contribution of Strehl ratio from refracting portion 22 fluctuates. If a value of integer m is taken properly, it is possible to enhance Strehl ratio. It is preferable that step amount (depth) b (a distance in the direction of optical axis p of the boundary between the basic aspheric surface of diffractive ring-shaped zones and refractive interface 22 shown with dotted lines) of step portion 23a is in a range from 1 μm to 10 μm.

Incidentally, though diffractive ring-shaped zones 13 and 23 are positioned to be recessed respectively from refracting interfaces 11 and 12 in FIG. 1 and FIG. 6, they may also be positioned to be protruded, and preferable dimensions (depths) of step portions 13a and 23a may be applied either to the recessed form or to the protruded form, by considering them as absolute values.

Next, the optical pickup apparatus of the first embodiment equipped with the objective lens stated above will be explained concretely as follows, referring to FIG. 3.

Figure 3:
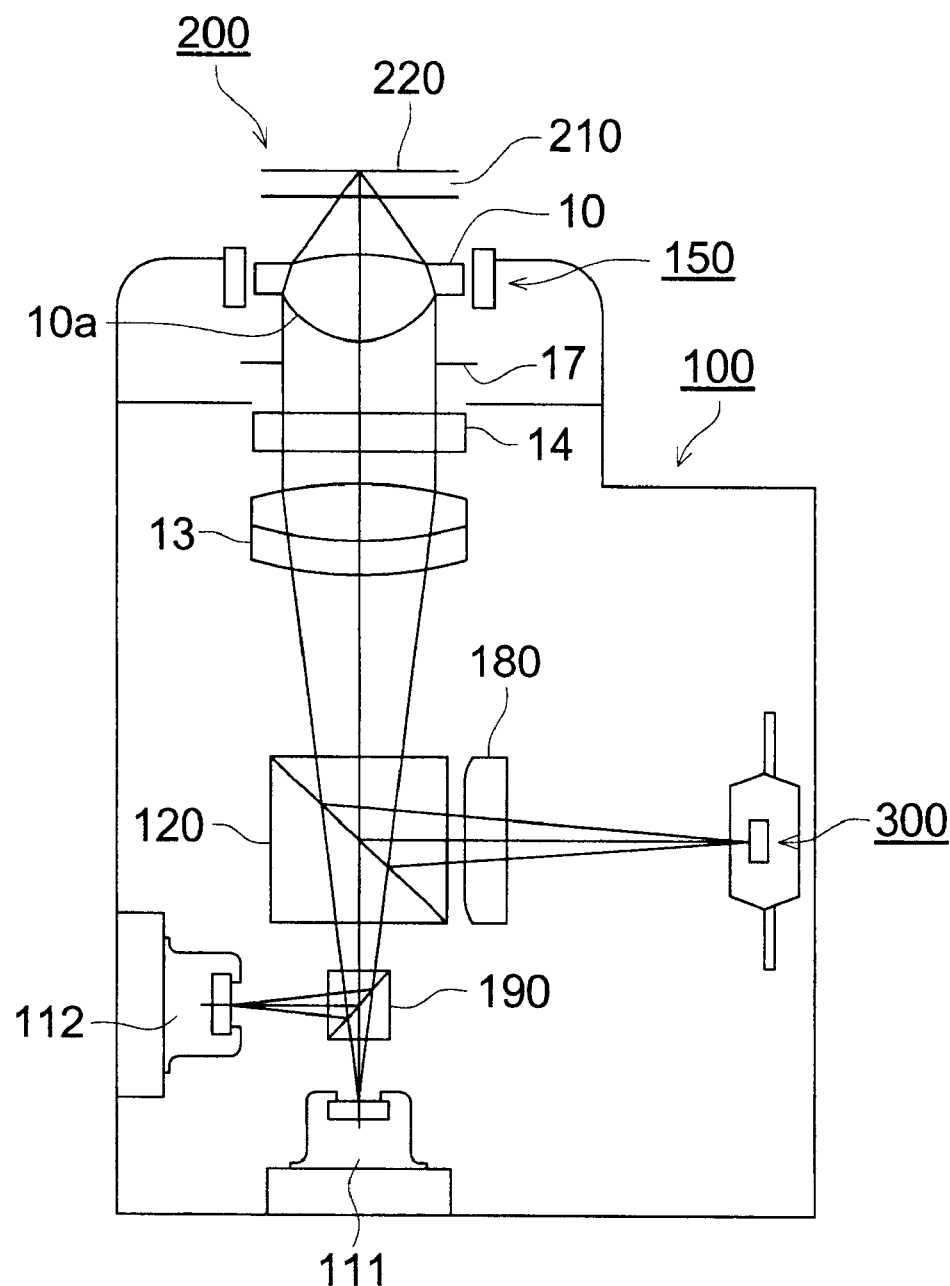
FIG. 3 is a schematic diagram of an optical pickup apparatus of the present embodiment equipped with the objective lens shown in FIG. 1.

The optical pickup apparatus shown in FIG. 3 is provided with first semiconductor laser 111 representing the first light source for reproducing the first optical disk and second semiconductor laser 112 representing the second light source for reproducing the second optical disk.

When reproducing the first optical disk, a beam is emitted from the first semiconductor laser 111, and the light flux thus emitted is transmitted through beam splitter 190 representing a composing means for beams emitted from both semiconductor lasers 111 and 112, and that light flux is transmitted through polarized beam splitter 120, collimator 13 and 1/4 wavelength plate 14 to turn out to be a collimated light flux of a circularly polarized light. This light flux is stopped down by diaphragm 17 and is converged by objective lens 10 on information recording surface 220 through transparent base board 210 of the first optical disk 200.

The light flux modulated by information bits on the information recording surface 220 and reflected is transmitted again through objective lens 10, diaphragm 17, 1/4 wavelength plate 14 and collimator 13, and then, enters polarized beam splitter 120 where it is reflected and is given astigmatism to enter optical detector 300, thus, its output signals are used and signals captured by reading information recorded on the first optical disk 200 are obtained.

A change in a quantity of light caused by changes in a form and a position of a spot on optical detector 300 is detected to conduct focusing detection and track detection. The objective lens 10 is moved so that two-dimensional actuator 150 may make the light flux emitted from the first semiconductor laser 111 to form images on recording surface 220 of the first optical disk 200 based on the aforesaid detection, and the objective lens 10 is moved so that the light flux from the semiconductor laser 111 may form images on the prescribed track.

When reproducing the second optical disk, a beam is emitted from the second semiconductor laser 112, and the light flux thus emitted is reflected by beam splitter 190 representing a composing means, and is converged on information recording surface 220 through polarized beam splitter 120, collimator 13, 1/4 wavelength plate 14, diaphragm 17 and objective lens 10 and through transparent base board 210 of the second optical disk 200, in the same way as in the light flux emitted from the first semiconductor laser 111.

The light flux modulated by information bits on the information recording surface 220 and reflected enters optical detector 300 through objective lens 10, diaphragm 17, 1/4 wavelength plate 14, collimator 13, polarized beam splitter 120 and cylindrical lens 180 again, thus, its output signals are used and signals captured by reading information recorded on the second optical disk 200 are obtained.

Further, in the same way as in the occasion of the first optical disk), a change in a quantity of light caused by changes in a form and a position of a spot on optical detector 300 is detected to conduct focusing detection and track detection, and the objective lens 10 is moved by two-dimensional actuator 150 for focusing and tracking.

Incidentally, the present objective lens is also appropriate for an optical pickup apparatus employing an optical system using a two-wavelength semiconductor laser wherein semiconductor laser 111 and semiconductor laser 112 are unitized, and a light source/detector module wherein semiconductor laser 111, semiconductor laser 112 and optical detector unit are unitized. In addition, it is also possible to apply to a pickup optical apparatus having a plurality of light sources known by those skilled in the art.

Figure 10:
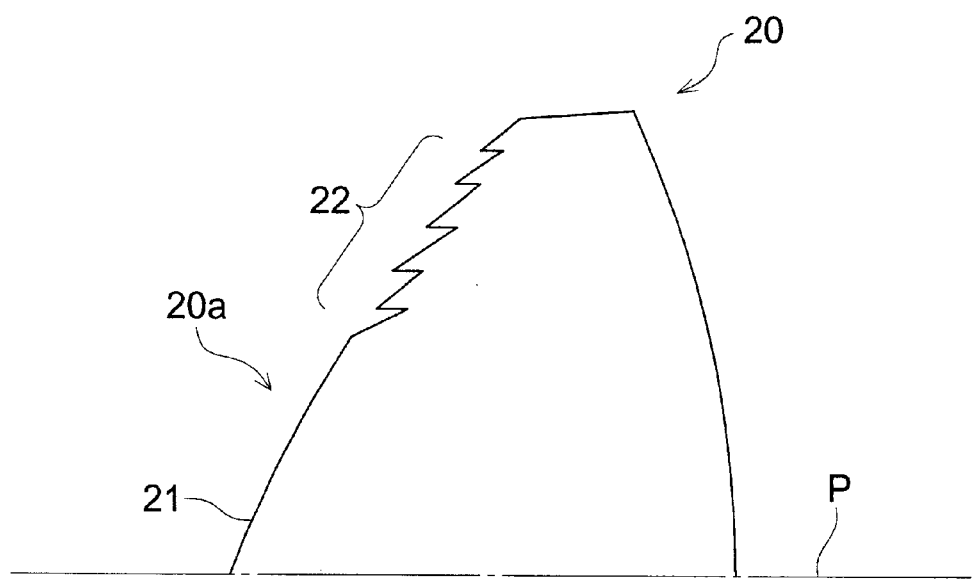
FIG. 10 is a sectional view of an illustrative upper half of an objective lens of the present embodiment.

Next, the second embodiment stated above will be explained as follows, referring to the drawings. FIG. 10 is a sectional view of an illustrative upper half of an objective lens for the optical pickup apparatus of the second embodiment of the invention. As shown in FIG. 10, objective lens 20 is provided on its first surface 20*a* with refracting interface 21 representing the first area closer to optical axis p, and with a second area and diffractive ring-shaped zones 22 representing a third area both provided on an outer circumferential area up to the outermost circumferential area on the refracting interface 21 being away from optical axis p, on a rotation-symmetrical basis.

Diffractive ring-shaped zones 22 are provided in a range that is not less than numerical aperture NAL1, and thus, the diffractive ring-shaped zones 22 are positioned on the peripheral portion of objective lens 20, and spherical aberration is corrected for two types of information recording media each having a different transparent base board thickness, by utilizing a difference of wavelengths of light sources.

As an example, when coping with DVD wherein necessary numerical aperture at wavelength of 660 nm is 0.65 and CD wherein necessary numerical aperture at wavelength of 785 nm is 0.5, diffractive ring-shaped zones 13 are provided in a range that is not less than NA 0.37 on first surface 20*a* of objective lens 20. Incidentally, it is preferable that a boundary between the second area and the third area, namely, a boundary between two types of diffractive surfaces within a diffractive surface is provided in the vicinity of NA 0.50. Then, a light flux of 785 nm is made possible to be converged on CD in the second area, and a light flux of 785 nm is radiated on CD as a flare in the third area, which is preferable.

On the refracting interface 21 located to be not more than NA 0.37, there is no loss caused by diffraction efficiency, and 100% of a quantity of light can be utilized. In the range where NA is as small as 0.37 or less, an influence on a spot diameter and spherical aberration both necessary for image forming power is small even when the spherical aberration is not corrected perfectly, and further, accuracy for recording and reproducing is high in virtue of a large quantity of light, and erroneous detection for focus signals can be prevented.

When manufacturing objective lenses through molding by a metal mold on a mass production basis, when the number of products is large, the number of metal molds themselves required is also large, and processing man-hour for the metal molds is increased, and in the case of a diffraction lens, in particular, processing of metal molds corresponding to the diffractive ring-shaped zones thereof is time-consuming. However, in the structure of peripheral diffractive ring-shaped zones, the number of ring-shaped zones is smaller than that in the structure of diffraction on an entire surface, and thereby, cost of metal molds can be reduced and fabrication cost can also be reduced.

The optical pickup apparatus relating to the present embodiment that is equipped with the objective lens stated above is one wherein the objective lens in FIG. 3 is changed to the objective lens stated above. Explanation of details of the optical pickup apparatus will be omitted here, because it is the same as the explanation of FIG. 3.

Next, Example 1 of the objective lens of a DVD/CD interchangeable type corresponding to FIG. 1 will be explained as follows.

On first surface 10*a* of objective lens 10 in FIG. 1, a central area (11) corresponding to numerical aperture NAL1 or less and a peripheral area (12) corresponding to NAH1 or more are represented by a refracting aspheric surface, and an intermediate area corresponding to numerical aperture NAL1 or more and to numerical aperture NAH1 or less is a diffractive surface 13. A second surface that is opposite to the first surface is a refracting aspheric surface.

The diffractive surface is expressed by a basic aspheric surface showing the macroscopic form from which diffractive relieves are removed and by an optical path difference function. Let it be assumed that the optical path difference function expresses an optical path difference added by a diffractive surface to diffracted light having a standard wavelength, and a diffractive ring-shaped zone is provided each time a value of the optical path difference function is changed by mλ (m represents a diffraction degree).

The optical path difference function $\phi$ (h) is expressed by the following expression;

$$\phi(h)=b0+b2*h2+b4*h4+b6*h6+\ldots \text{ (mm)}$$

wherein, h represents a distance from an optical axis and each of b0, b2, b4, b6, . . . is a coefficient of the optical path difference function.

The aspheric surface is expressed by the following expression;

$$x=(h2/r)(1+\sqrt{(1-(1+k)h2/r2)}+A0+A2h2+A4h4+A6h6+\ldots$$

wherein A0, A2, A4, A6, . . . represent a coefficient of aspheric surface, k represents a constant of the cone, r represents a paraxial radius of curvature, and r, d and n represent respectively a radius of curvature of a lens, a distance between surfaces and a refractive index.

When $\lambda 1$ representing a wavelength of a light source is 655 nm, focal length f is 3.36 and a numerical aperture on the image side is 0.60 (necessary numerical aperture NA1 is 0.60).

When $\lambda 2$ representing a wavelength of a light source is 785 nm, focal length f is 3.38 and a numerical aperture on the image side is 0.60 (necessary numerical aperture NA2 is 0.50).

Lens data in Example 1 are shown in the following Table 1.

TABLE 1

| Surface No. | | R | d1 | d2 | n1 | n2 |
|---|---|---|---|---|---|---|
| | Object position | ∞ | | ∞ | | |
| 1 | (aspheric surface 1, diffractive surface) | (as in the following) | 2.20 | 2.20 | 1.5409 | 1.5372 |
| 2 | (Aspheric surface 2) | −8.3337 | 1.75 | 1.39 | | |
| 3 | (Cover glass) | ∞ | 0.60 | 1.20 | 1.5775 | 1.5706 |
| 4 | | ∞ | | | | |

Suffix "1" represents an occasion of $\lambda 1 = 655$ nm and suffix "2" represents an occasion of $\lambda 2 = 785$ nm.
NAH1 = 0.50
NAL1 = 0.37

Figure 4:
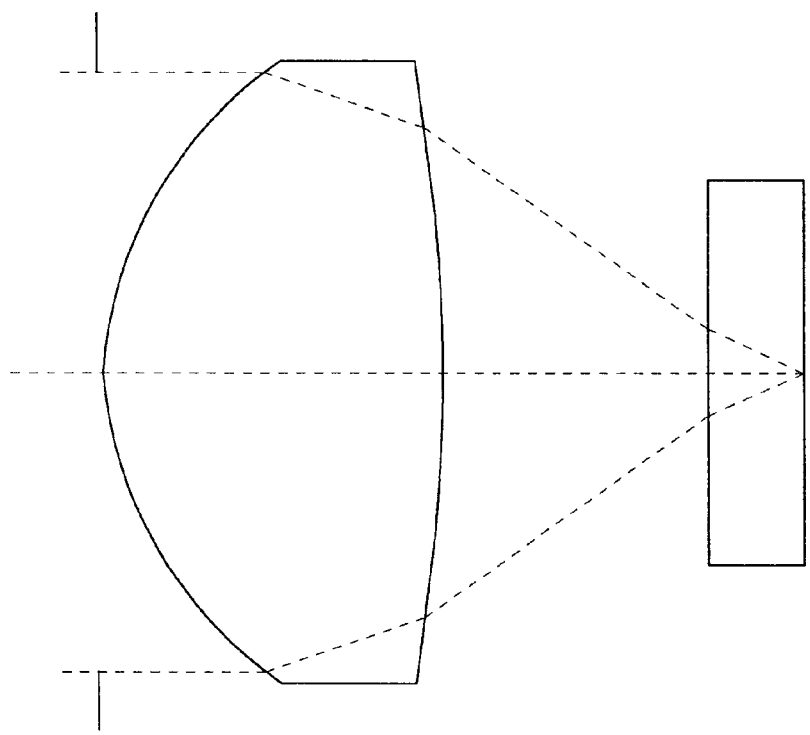
FIG. 4 is a sectional view of an objective lens of Example 1.
Figure 5:
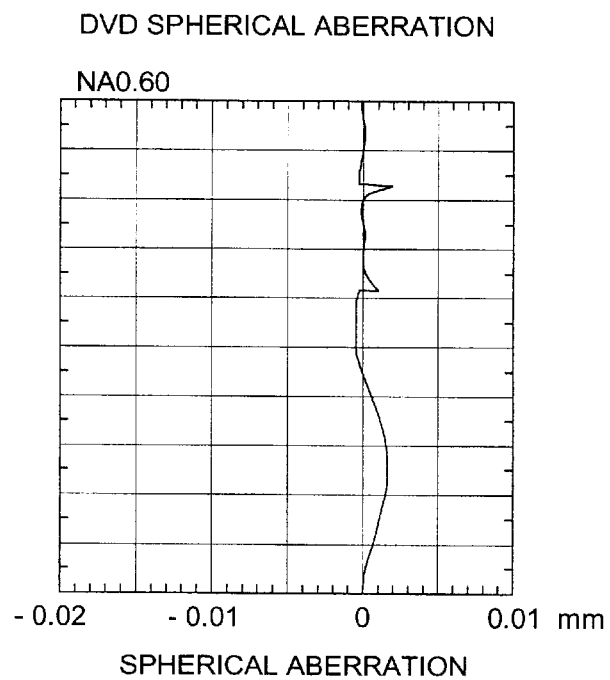
FIG. 5(a) shows spherical aberration diagram for DVD and FIG. 5(b) shows spherical aberration diagram for CD both for the objective lens of Example 1.
Figure 5:
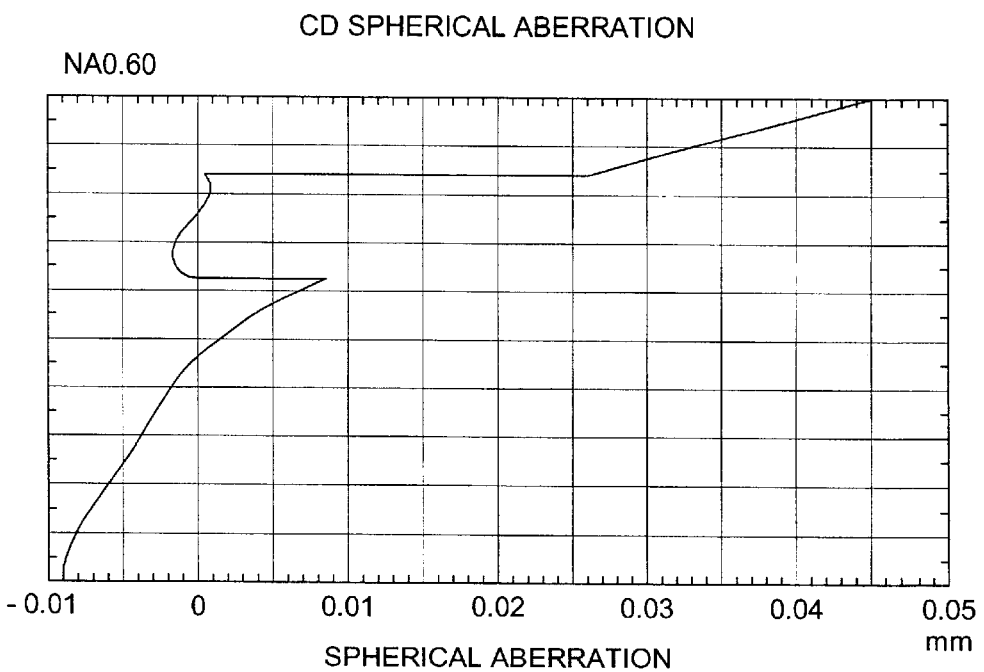

Coefficient of optical path difference function
(Standard wavelength 730 nm)

b0 = 0
b2 = $0.63118 \times 10^{-2}$
b4 = $0.23231 \times 10^{-3}$
b6 = $-0.37705 \times 10^{-2}$
b8 = $0.16273 \times 10^{-2}$
b10 = $-0.22634 \times 10^{-3}$ Coefficient of aspheric surface
First surface
For $h \leq 1.25$ (distance from optical axis corresponding to NAL1) and 1.68 (distance from optical axis corresponding to NAH1 $\leq h$)

k = −2.6401
R = 2.1091
A0 = 0
A2 = 0
A4 = $0.27923 \times 10^{-1}$
A6 = $-0.26454 \times 10^{-2}$
A8 = $0.67852 \times 10^{-5}$
A10 = $0.15219 \times 10^{-3}$
A12 = $-0.34986 \times 10^{-4}$
A14 = $0.23609 \times 10^{-5}$ For $1.25 \leq h \leq 1.68$ k = −1.3094
R = 2.0853
A0 = 0
A2 = 0
A4 = $0.16975 \times 10^{-1}$
A6 = $0.72826 \times 10^{-2}$
A8 = $0.22932 \times 10^{-2}$
A10 = $-0.22014 \times 10^{-3}$
A12 = $0.13420 \times 10^{-4}$
A14 = $-0.12090 \times 10^{-4}$
A16 = $0.20816 \times 10^{-5}$
A18 = $-0.21053 \times 10^{-6}$ Second surface k = −6.2561
A0 = 0
A2 = 0
A4 = $0.13683 \times 10^{-1}$
A6 = $-0.54212 \times 10^{-2}$
A8 = $0.20117 \times 10^{-2}$
A10 = $-0.57610 \times 10^{-3}$
A12 = $0.88118 \times 10^{-4}$
A14 = $-0.50211 \times 10^{-5}$ FIG. 4 shows a sectional view of the objective lens, and FIG. 5(a) shows spherical aberration for DVD, while, FIG. 5(b) shows spherical aberration for CD.

A depth of step portion 13a at NAL1 is 6.45 μm, and a surface of a metal mold corresponding to the diffractive ring-shaped zone is machined by a cutting tool whose edge radius is 4 μm, and diffraction efficiency on the first surface shown when the first degree diffracted light was used are shown in Table 2.

TABLE 2

| | Example | |
|---|---|---|
| | DVD | CD |
| $0 \leq NA \leq 0.37$ (Refracting interface) | 100% | 100% |
| $0.37 \leq NA \leq 0.50$ (Diffractive surface) | 86% | 88% |
| $0.50 \leq NA \leq 0.60$ ((Refracting interface) | 100% | |
| Mean value (area-weighted value) | 96% | 95% |

As a comparative example wherein diffraction efficiency in the case of the first surface whose entire surface is made to be diffractive surface under the same specifications is 88% for DVD and 89% for CD, when the present example is compared with a total-surface-diffractive lens in the comparative example, it is found that the diffraction efficiency of the present example is high and a quantity of light can be used more. In the case of DVD, in particular, it is understood that Strehl ratio is 100% and efficiency of using a laser is excellent.

Next, Example 2 and Example 3 will be explained. Each of the Example 2 and Example 3 is an objective lens of a DVD/CD interchangeable type which is the same as that in Example 1, having a sectional view that is almost the same as that in FIG. 4 and a shape wherein FIG. 1 and FIG. 6 are combined, and it has step portion 13a (FIG. 1) on a boundary with a refracting interface that is close to an optical axis of a diffractive ring-shaped zone and step portion 23a (FIG. 6) on a boundary that is away from an optical axis. The diffractive surface is expressed with the diffractive surface is expressed by a basic aspheric surface showing the macroscopic form from which diffractive relieves are removed which is the same as that in Example 1 and by an optical path difference function expressed by the aforesaid expression. The aspheric surface is also expressed by the expression above.

In the objective lens of Example 2, focal length f is 3.36 and numerical aperture on the image side is 0.60 (necessary numerical aperture NA1 is 0.60), when $\lambda 1$ representing a wavelength of a light source is 655 nm.

when $\lambda 2$ representing a wavelength of a light source is 785 nm, focal length f is 3.38 and numerical aperture on the image side is 0.60 (necessary numerical aperture NA2 is 0.50).

Lens data in Example 2 are shown in the following Table 2.

TABLE 3

Example 2

| Surface No. | R | d1 | d2 | n1 | n2 |
|---|---|---|---|---|---|
| Object position | ∞ | | ∞ | | |
| 1 (Aspheric surface 1, diffractive surface) | (as in the following) | 2.20 | 2.20 | 1.5409 | 1.5372 |
| 2 (Aspheric surface 2) | −8.06089 | 1.76 | 1.40 | | |
| 3 (Cover glass) | ∞ | 0.60 | 1.20 | 1.5775 | 1.5706 |
| 4 | ∞ | | | | |

Suffix "1" represents an occasion of $\lambda 1 = 655$ nm and suffix "2" represents an occasion of $\lambda 2 = 785$ nm.
NAH1 = 0.51
NAL1 = 0.37

| Coefficient of optical path difference function (Standard wavelength 730 nm) |
|---|
| b0 = 0 |
| b2 = −1.24894 E−2 |
| b4 = 1.26108 E−2 |
| b6 = 5.96014 E−3 |
| b8 = −1.55626 E−3 |
| b10 = 1.54982 E−4 |

| Coefficient of aspheric surface First surface For h ≦ 1.247 (distance from optical axis corresponding to NAL1) |
|---|
| R = 2.12185 |
| k = −3.127226 |
| A4 = 3.339410E−02 |
| A6 = −4.762560E−03 |
| A8 = 5.236180E−04 |
| A10 = 1.406590E−04 |
| A12 = −5.888870E−05 |
| A14 = 5.722600E−06 |

| For 1.247 ≦ h ≦ 1.709 |
|---|
| R = 2.14748 |
| k = −1.4553 |
| A0 = 0.008945 |
| A4 = 1.719700E−02 |
| A6 = −5.247800E−03 |
| A8 = 2.371800E−03 |
| A10 = −5.564200E−04 |
| A12 = −2.778500E−06 |
| A14 = 3.485500E−05 |
| A16 = −8.937000E−06 |
| A18 = 8.671900E−07 |

| For 1.709 (distance from optical axis corresponding to NAH1) |
|---|
| R = 2.17886 |
| k = −2.922266 |
| A4 = 3.359440E−03 |
| A6 = −4.916430E−03 |
| A8 = 4.990420E−04 |
| A10 = 1.399700E−04 |
| A12 = −5.486370E−05 |
| A14 = 5.204870E−06 |

| Coefficient of aspheric surface Second surface |
|---|
| R = −8.06089 |
| k = 0.677053 |
| A4 = 1.378200E−02 |
| A6 = −2.943670E−03 |
| A8 = 1.033580E−03 |
| A10 = −6.789910E−04 |
| A12 = 2.057110E−04 |
| A14 = −2.069290E−05 |

Figure 7:
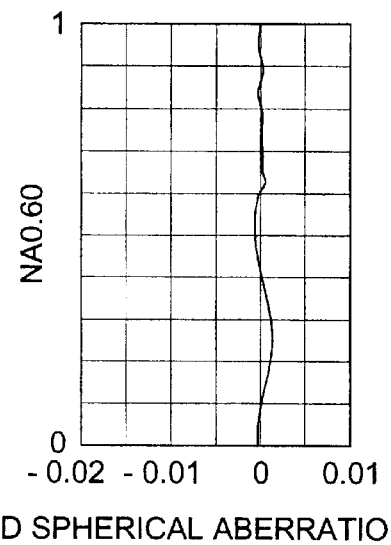
FIG. 7(a) shows spherical aberration diagram for DVD and FIG. 7(b) shows spherical aberration diagram for CD both for the objective lens of Example 2.
Figure 7:
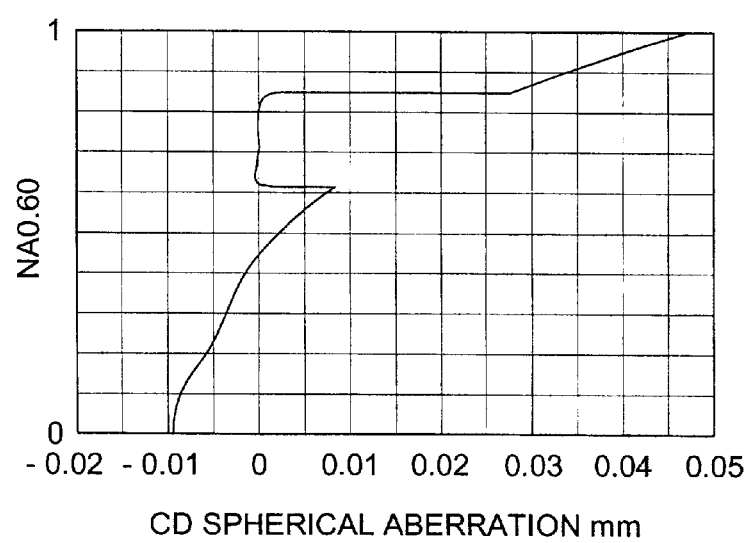

A depth of a step portion at NAH1 (corresponding to step portion 23a in FIG. 6) is 2.752 μm, and a depth of a step portion at NAL1 (corresponding to step portion 13a in FIG. 1) is 6.447 μm. Incidentally, with regard to a sign of the depth of the step portion, it is positive when a portion that is on the outer side is displaced to be closer to the image side (the optical information recording medium side) than a portion that is on the inner side, at the boundary portion. A diagram of spherical aberration of the objective lens in Example 2 for DVD is shown in FIG. 7(a) and that for CD is shown in FIG. 7(b).

In the objective lens of Example 3, focal length f is 3.36 and numerical aperture on the image side is 0.60 (necessary numerical aperture NA1 is 0.60), when $\lambda 1$ representing a wavelength of a light source is 660 nm.

when $\lambda 2$ representing a wavelength of a light source is 794 nm, focal length f is 3.38 and numerical aperture on the image side is 0.60 (necessary numerical aperture NA2 is 0.45).

Lens data in Example 3 are shown in the following Table 4.

TABLE 4

Example 3

| Surface No. | R | d1 | d2 | n1 | n2 |
|---|---|---|---|---|---|
| Object position | ∞ | | ∞ | | |
| 1 (Aspheric surface 1, diffractive surface) | (as in the following) | 2.20 | 2.20 | 1.5407 | 1.5370 |
| 2 (Aspheric surface 2) | −7.95885 | 1.76 | 1.41 | | |
| 3 (Cover glass) | ∞ | 0.60 | 1.20 | 1.5771 | 1.5703 |
| 4 | ∞ | | | | |

Suffix "1" represents an occasion of $\lambda 1 = 660$ nm and suffix "2" represents an occasion of $\lambda 2 = 794$ nm.
NAH1 = 0.46
NAL1 = 0.34

| Coefficient of optical path difference function (Standard wavelength 720 nm) |
|---|
| b0 = 0 |
| b2 = 1.6275 R−2 |
| b4 = −1.7463 E−2 |
| b6 = 6.3792 E−3 |
| b8 = −5.2353 E−4 |
| b10 = −1.2137 E−4 |

-continued

Coefficient of aspheric surface
First surface
For h ≦ 1.156
(distance from optical axis corresponding to NAL1)

| | |
|---|---|
| R = | 2.126080E+00 |
| k = | −3.509761E+00 |
| A4 = | 3.701490E−02 |
| A6 = | −2.587240E−03 |
| A8 = | −4.694960E−03 |
| A10 = | 3.654920E−03 |
| A12 = | −8.601130E−04 |
| A14 = | −1.349650E05 |

For ≦ 1.156 ≦ h ≦ 1.529

| | |
|---|---|
| R = | 2.114800E+00 |
| k = | −1.551900E+00 |
| A0 = | 8.298000E−03 |
| A4 = | 1.596400E−02 |
| A6 = | −6.235800E−03 |
| A8 = | 2.398400E−03 |
| A10 = | −2.524900E−04 |
| A12 = | 1.388000E−04 |
| A14 = | 1.184400E−05 |
| A16 = | −5.862100E−05 |
| A18 = | 1.256800E−05 |

For h ≦ 1.529
(distance from optical axis corresponding to NAH1)

| | |
|---|---|
| R = | 2.210890E+00 |
| k = | −2.882694E+00 |
| A0 = | 3.893000E−03 |
| A2 = | 3.387460E−02 |
| A4 = | −4.930180E−03 |
| A6 = | 4.646760E−04 |
| A8 = | 1.351520E−04 |
| A10 = | 1.351520E−04 |
| A12 = | −5.107710E−05 |
| A14 = | 4.840310E−06 |

Coefficient of aspheric surface
Second surface

| | |
|---|---|
| R = | −7.958850E+00 |
| k = | −6.562274E+00 |
| A4 = | 1.486460E−02 |
| A6 = | −5.064000E−03 |
| A8 = | 1.448040E−03 |
| A10 = | −5.437790E−04 |
| A12 = | 1.447470E−04 |
| A14 = | −1.424690E−05 |

Figure 8:
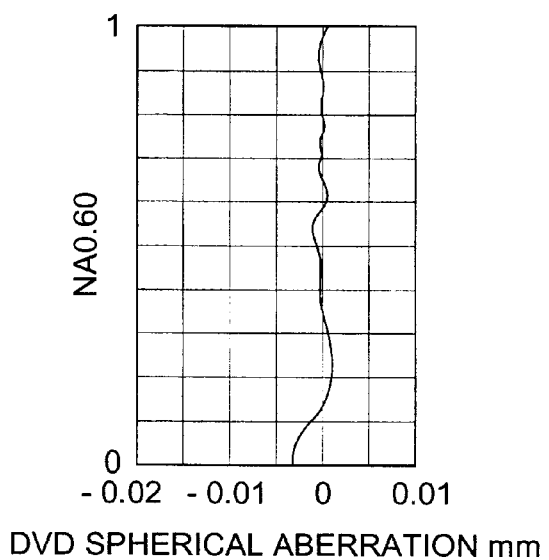
FIG. 8(a) shows spherical aberration diagram for DVD and FIG. 8(b) shows spherical aberration diagram for CD both for the objective lens of Example 3.
Figure 8:
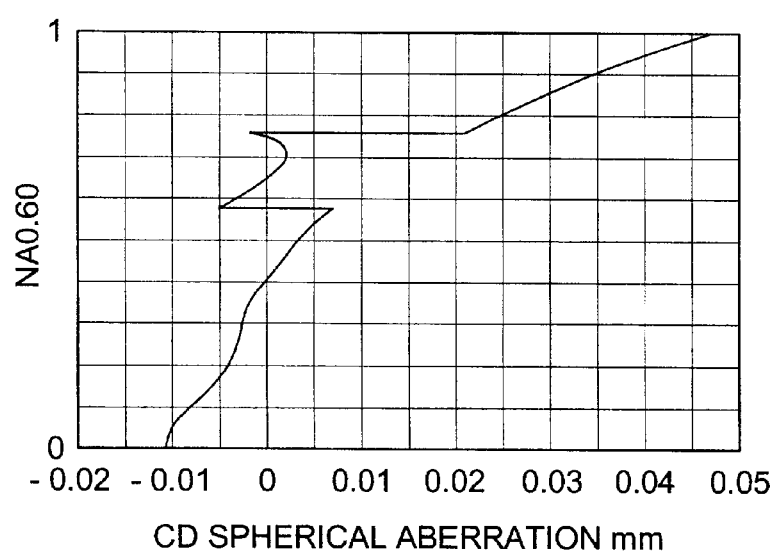

A depth of a step portion at NAH1 (corresponding to step portion 23a in FIG. 6) is −2.784 μm, and a depth of a step portion at NAL1 (corresponding to step portion 13a in FIG. 1) is 6.378 μm. Incidentally, with regard to a sign of the depth of the step portion, it is positive when a portion that is on the outer side is displaced to be closer to the image side (the optical information recording medium side) than a portion that is on the inner side, at the boundary portion. A diagram of spherical aberration of the objective lens in Example 3 for DVD is shown in FIG. 8(a) and that for CD is shown in FIG. 8(b). Incidentally, E (or, e) is used for expression of an exponent for 10 in Table 3 and Table 4, and E-02 (=10-2) is used as an example.

In the example above, a surface of an objective lens is composed of three divided surfaces (areas) and a diffractive structure is provided on an intermediate area. However, the number of divided surfaces is not limited to this, and three or more divided surfaces may also be provided in the structure, and for example, an area where diffractive structure is provided may further be divided into plural divided surfaces, or an area of a refracting interface such as a central area where no diffractive structure is provided may further be composed of divided surfaces.

Next, an example of an objective lens of a DVD/CD interchangeable type corresponding to FIG. 10 will be explained as follows, as Example 4.

On the first surface 20a of objective lens 20 shown in FIG. 10, a central area (21) corresponding to numerical aperture NAL1 or less is a refracting aspheric surface, and a peripheral area (22) corresponding to numerical aperture from NAL1 to NAH1 is a diffractive surface.

On the diffractive surface, an area corresponding to numerical aperture ranging from NAL1 to NA2 and an area corresponding to numerical aperture ranging from NA2 to NAH1 are different each other in terms of an optical path difference function and a coefficient of basic aspheric surface. On the former area, spherical aberration on each of DVD and CD is corrected to be almost aplanatic, and on the latter area, spherical aberration on DVD is corrected to be almost aplanatic, and spherical aberration on CD is flared. The second surface is a refracting aspheric surface.

The diffractive surface is expressed by a basic aspheric surface showing the macroscopic form from which diffractive relieves are removed and by an optical path difference function. Let it be assumed that the optical path difference function expresses an optical path difference added by a diffractive surface to diffracted light having a standard wavelength, and a diffractive ring-shaped zone is provided each time a value of the optical path difference function is changed by mλ (m represents a diffraction degree).

The optical path difference function φ(h) is expressed by the following expression;

$\phi(h) = b0 + b2*h2 + b4*h4 + b6*h6 + \ldots$ (mm)

wherein, h represents a distance from an optical axis and each of b0, b2, b4, b6, . . . is a coefficient of the optical path difference function.

The aspheric surface is expressed by the following expression;

$x = (h2/r)(1 + \sqrt{(1 - (1+k)h2/r2)} + A0 + A2h2 + A4h4 + A6h6 + \ldots$ wherein A0, A2, A4, A6, . . . represent a coefficient of aspheric surface, k represents a constant of the cone, r represents a paraxial radius of curvature, and r, d and n represent respectively a radius of curvature of a lens, a distance between surfaces and a refractive index.

When λ1 representing a wavelength of a light source is 660 nm, focal length f is 3.20 and a numerical aperture on the image side is 0.65 (necessary numerical aperture NA1 is 0.65).

When λ2 representing a wavelength of a light source is 785 nm, focal length f is 3.22 and a numerical aperture on the image side is 0.65 (necessary numerical aperture NA2 is 0.50).

Lens data are shown in the following Table 4.

TABLE 5

| Surface No. | R | d1 | d2 | n1 | n2 |
|---|---|---|---|---|---|
| Object position | | ∞ | ∞ | | |
| 1 (Aspheric surface 1, diffractive surface) | (as in the following) | 1.94 | 1.94 | 1.5408 | 1.5372 |
| 2 (Aspheric surface 2) | −8.3819 | 1.73 | 1.38 | | |

TABLE 5-continued

| Surface No. | R | d1 | d2 | n1 | n2 |
|---|---|---|---|---|---|
| 3 (Cover glass) | ∞ | 0.60 | 1.20 | 1.5772 | 1.5706 |
| 4 | ∞ | | | | |

Suffix "1" represents an occasion of $\lambda 1 = 660$ nm and suffix "2" represents an occasion of $\lambda 2 = 785$ nm.
NAH1 = 0.65
NAL1 = 0.37

Coefficient of optical path difference function
For 1.18 (distance from optical axis corresponding to NAL1) $\leq$
h $\leq$ 1.60 (distance from optical axis corresponding to NA2)
(Standard wavelength 720 nm)

$b_0 = 0.20 \times 10^{-4}$
$b_2 = 0.50634 \times 10^{-2}$
$b_4 = -0.46705 \times 10^{-2}$
$b_6 = 0.44772 \times 10^{-3}$
$b_8 = 0.34815 \times 10^{-3}$
$b_{10} = -0.10005 \times 10^{-3}$ For 1.60 (distance from optical axis corresponding to NA2) $\leq$
h $\leq$ 2.08 (distance from optical axis corresponding to NA1)
(Standard wavelength 660 nm)

$b_0 = 0.55 \times 10^{-5}$
$b_2 = 0.21223 \times 10^{-3}$
$b_4 = -0.49940 \times 10^{-3}$
$b_6 = -0.64151 \times 10^{-4}$
$b_8 = -0.94365 \times 10^{-5}$
$b_{10} = 0.47239 \times 10^{-5}$ Coefficient of aspheric surface
First surface
For h $\leq$ 1.18
(distance from optical axis corresponding to NAL1)

$R = 2.0035$
$k = -2.7866$
$A_0 = 0$
$A_2 = 0$
$A_4 = 0.35612 \times 10^{-1}$
$A_6 = -0.41766 \times 10^{-2}$
$A_8 = 0.26017 \times 10^{-3}$
$A_{10} = 0.19744 \times 10^{-3}$
$A_{12} = -0.60537 \times 10^{-4}$
$A_{14} = 0.51916 \times 10^{-5}$ For 1.18 (distance from optical axis corresponding to NAL1) $\leq$
h $\leq$ 1.60 (distance from optical axis corresponding to NA2)

$R = 1.9689$
$k = -2.7580$
$A_0 = 0.2047 \times 10^{-2}$
$A_2 = 0$
$A_4 = 0.32249 \times 10^{-1}$
$A_6 = -0.47888 \times 10^{-2}$
$A_8 = 0.72564 \times 10^{-3}$
$A_{10} = 0.68277 \times 10^{-4}$
$A_{12} = 0.13752 \times 10^{-4}$
$A_{14} = -0.14254 \times 10^{-4}$
$A_{16} = -0.46385 \times 10^{-5}$
$A_{18} = 0.13899 \times 10^{-5}$ For 1.60 (distance from optical axis corresponding to NA2) $\leq$
h $\leq$ 2.08 (distance from optical axis corresponding to NA1)

Figure 11:
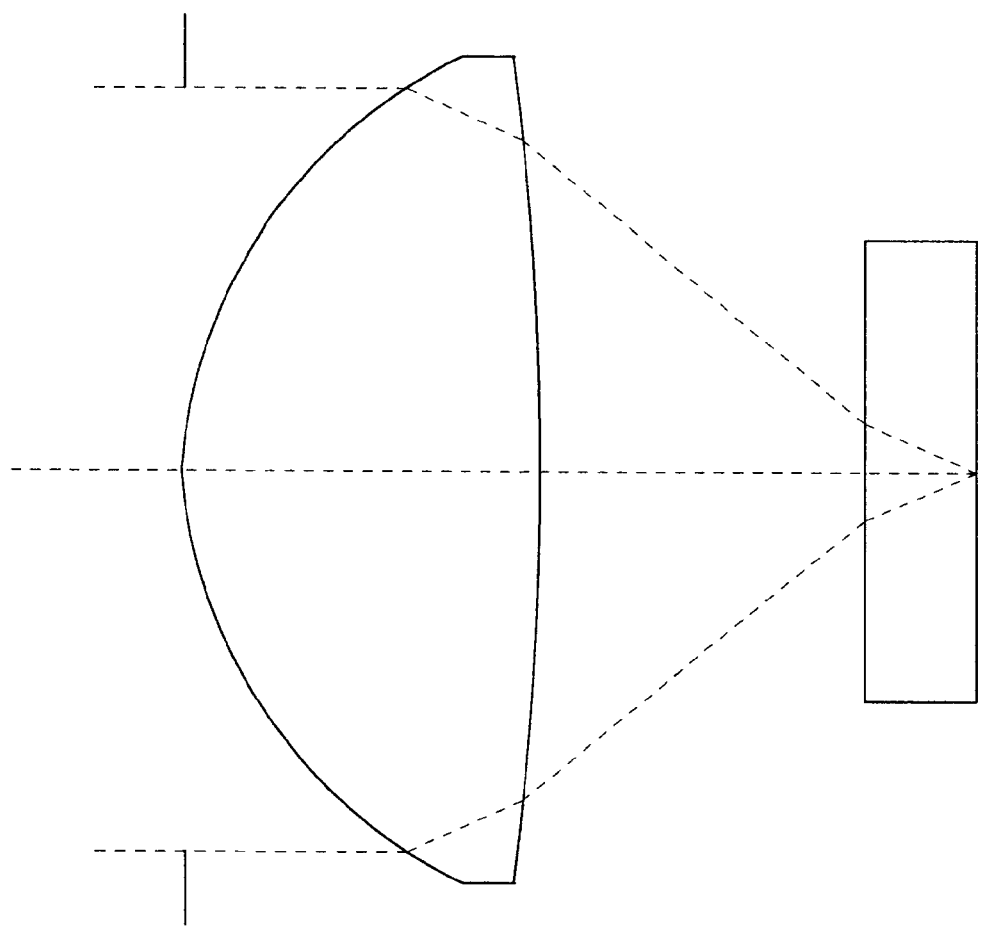
FIG. 11 is a sectional view of an objective lens of the present example.
Figure 12:
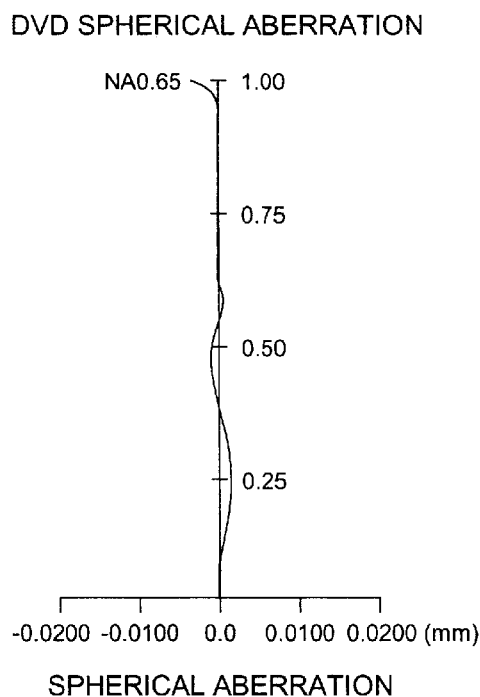
FIG. 12 is a diagram of spherical aberration of an objective lens of the present example.
Figure 12:
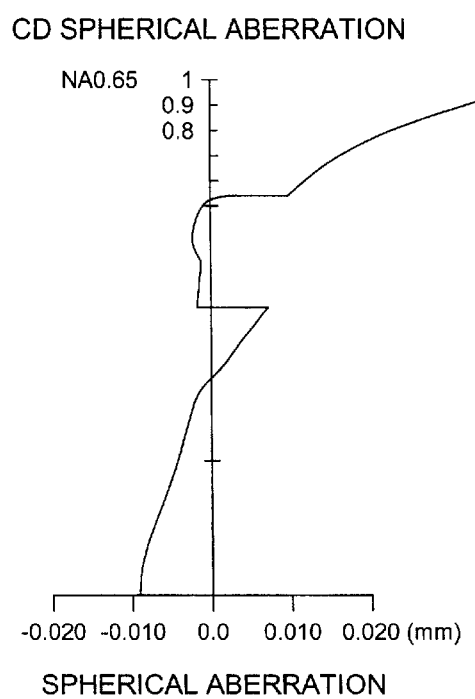

$R = 1.98717$
$k = -2.8992$
$A_0 = 0$
$A_2 = 0$
$A_4 = 0.34643 \times 10^{-1}$
$A_6 = -0.43864 \times 10^{-2}$
$A_8 = 0.25482 \times 10^{-3}$
$A_{10} = 0.20180 \times 10^{-3}$
$A_{12} = -0.61940 \times 10^{-4}$
$A_{14} = 0.55476 \times 10^{-5}$ Coefficient of aspheric surface
Second surface $k = -30.270$
$A_0 = 0$
$A_2 = 0$
$A_4 = 0.13233 \times 10^{-1}$
$A_6 = -0.60634 \times 10^{-2}$
$A_8 = 0.21112 \times 10^{-2}$
$A_{10} = -0.58812 \times 10^{-3}$
$A_{12} = 0.99155 \times 10^{-4}$
$A_{14} = -0.67653 \times 10^{-5}$ FIG. 11 shows a sectional view of the objective lens, nd FIG. 12(a) shows spherical aberration for DVD, while, FIG. 12(b) shows spherical aberration for CD.

The surface of a metal mold corresponding to the diffractive ring-shaped zone of the metal mold is machined by a cutting tool whose edge radius is 4 μm, and diffraction efficiency on the first surface shown when the first degree diffracted light is used are shown in Table 5.

TABLE 6

| | Example | |
|---|---|---|
| | DVD | CD |
| $0 \leq NA \leq 0.37$ (Refracting interface) | 100% | 100% |
| $0.37 \leq NA \leq 0.50$ (Diffractive surface) | 84% | 84% |
| $0.50 \leq NA \leq 0.65$ ((Refracting interface) | 86% | — |
| Mean value (area-weighted value) | 90% | 93% |

As a comparative example wherein diffraction efficiency in the case of the first surface whose entire surface is made to be diffractive surface under the same specifications is 88% for DVD and 89% for CD, when the present example is compared with a total-surface-diffractive lens in the comparative example, it is found that the diffraction efficiency of the present example is high and a quantity of light can be used more. In the case of DVD, in particular, it is understood that Strehl ratio is 100% and efficiency of using a laser is excellent.

With regard to pitch pi of $9^{th}$ (i=) diffractive ring-shaped zone, pi is 28 μm, pi+1 is 41 μm and pi+1/pi is 1.5, which satisfy the aforesaid expression.

Incidentally, when the secondary diffracted light is used in the area of $0.50 \leq NA \leq 0.65$, the diffraction efficiency for DVD is enhanced to be higher than the results shown in Table 5.

Further, as Example 4, the example is produced such that in the optical path difference function in Example 3, $b_0$ at the time of $1.18 \leq h \leq 1.60$ is changed from $0.20 \times 10^{-4}$ to $-0.55 \times 10^{-5}$ and $b_0$ at the time of $1.60 \leq h \leq 2.08$ is changed from $0.55 \times 10^{-5}$ to $-0.20 \times 10^{-4}$. As a result, the good result as same as that in Example 3 can be obtained.

In the example above, a surface of an objective lens is composed of three divided surfaces (areas) and a diffractive structure is provided on an intermediate area and an outer area. However, the number of divided surfaces is not limited to this, and three or more divided surfaces may also be provided in the structure, and for example, an intermediate area and/or an outer area where diffractive structure is provided may further be divided into plural divided surfaces, or an area of a refracting interface such as a central area where no diffractive structure is provided may further be composed of divided surfaces.

An objective lens used in an optical pickup apparatus and an optical pickup apparatus provided with the objective lens make it possible to use a quantity of light sufficiently, to check erroneous detection of light coming from an information recording medium, and to restrain an increase of fabrication cost.

Disclosed embodiment can be varied by a skilled person without departing from the spirit and scope of the invention.

What is claimed is:

1. An optical pickup apparatus for conducting reproducing or recording information of at least two kinds of optical information recording media, comprising:
    a first light source to emit first light flux having a first wavelength to conduct reproducing or recording information of a first optical information recording medium having a first transparent base board;
    a second light source to emit second light flux having a second wavelength to conduct reproducing or recording information of a second optical information recording medium having a second transparent base board;
    an optical converging system having at least one optical element; and
    a photo detector to receive and detect light transmitting through or reflecting from a first information recording surface of the first optical information recording medium or light transmitting through or reflecting from a second information recording surface of the second optical information recording medium;
    wherein the first wavelength is different from the second wavelength and the thickness of the first transparent base board is different from that of the second transparent base board,
    wherein the optical element comprises a first region including an optical axis and a second region adjoining the first region and locating at the outside of the first region, the first region is a refractive surface and the second region is a diffractive surface,
    wherein when the first light flux passes through the second region of the optical element, the light amount of n-th order diffracted ray of the first light flux is larger than that of any other order diffracted ray of the first light flux, and when the second light flux passes through the second region of the optical element, the light amount of n-th order diffracted ray of the second light flux is larger than that of any other order diffracted ray of the second light flux, where n is an integer except 0,
    wherein the optical converging system converges the first light flux having passed through the first region and the n-th order diffracted ray of the first light flux having passed through the second region through the first transparent base board onto the first information recording surface so as to conduct reproducing or recording information of the first optical information recording medium, and the optical converging system converges the second light flux having passed through the first region through the second transparent base board onto the second information recording surface so as to conduct reproducing or recording information of the second optical information recording medium.

2. The optical pickup apparatus of claim 1, wherein the optical element comprises a third region adjoining the second region and locating at the outside of the second region and the third region is a refractive surface, and
    wherein the optical converging system converges the first light flux having passed through the first region, the n-th order diffracted ray of the first light flux having passed through the second region and the first light flux having passed through the third region through the first transparent base board onto the first information recording surface so as to conduct reproducing or recording information of the first optical information recording medium, and the optical converging system converges the second light flux having passed through the first region and the n-th order diffracted ray of the second light flux having passed through the second region through the second transparent base board onto the second information recording surface so as to conduct reproducing or recording information of the second optical information recording medium.

3. The optical pickup apparatus of claim 2, wherein the optical converging system comprises an objective lens and satisfies the following conditional formula:

$NA2<NA1$ $NAH1<NA1$ $(1/3)NA2<NAL1<NA2$ where $NA1$ is a necessary numerical aperture of the objective lens at an optical information recording medium side to be necessary to reproduce or record information of the first optical information recording medium with the first light flux; $NA2$ is a necessary numerical aperture of the objective lens at an optical information recording medium side to be necessary to reproduce or record information of the second optical information recording medium with the second light flux; $NAH1$ is a numerical aperture of the objective lens at an optical information recording medium side for the first light flux having passed through at a position of the second region locating farthest from the optical axis; and $NAL1$ is a numerical aperture of the objective lens at an optical information recording medium side for the first light flux having passed through at a position of the second region locating closest to the optical axis.

4. The optical pickup apparatus of claim 3, wherein the following conditional formula is satisfied:

$NAH1<(9/10)NA1$ $(1/2)NA2<NAL1<NA2.$

5. The optical pickup apparatus of claim 4, wherein the following conditional formula is satisfied:

$0.45 \leq NAH1 \leq 0.56$ $0.3 \leq NAL1 < 0.45.$

6. The optical pickup apparatus of claim 2, wherein total of a wavefront aberration of the first light flux having passed through the first region, the n-th order diffracted ray of the first light flux having passed through the second region and the first light flux having passed through the third region is $0.07 \lambda$ rms or less on the first information recording surface and total of a wavefront aberration of the second light flux having passed through the first region and the n-th order diffracted ray of the second light flux having passed through the second region is $0.07 \lambda$ rms or less on the second information recording surface.

7. The optical pickup apparatus of claim 6, wherein total of a wavefront aberration of the second light flux having passed through the first region and the n-th order diffracted ray of the second light flux having passed through the second region and the second light flux having passed through the third region is larger than 0.07 λ rms on the second information recording surface.

8. The optical pickup apparatus of claim 2, wherein the optical element further comprises a stepped section having a stepped surface being parallel or almost parallel to an optical axis at a boundary between the second region and the third region and a length of the stepped surface in a direction of the optical axis is 1 μm to 10 μm.

9. The optical pickup apparatus of claim 1, wherein the optical element comprises a third region adjoining the second region and locating at the outside of the second region and the third region is a diffractive surface, wherein when the first light flux passes through the third region of the optical element, the light amount of m-th order diffracted ray of the first light flux is larger than that of any other order diffracted ray of the first light flux, and when the second light flux passes through the third region of the optical element, the light amount of m-th order diffracted ray of the second light flux is larger than that of any other order diffracted ray of the second light flux, where m is an integer except 0 and is equal to or different from n, and wherein the optical converging system converges the first light flux having passed through the first region, the n-th order diffracted ray of the first light flux having passed through the second region and the m-th order diffracted ray of the first light flux having passed through the third region through the first transparent base board onto the first information recording surface so as to conduct reproducing or recording information of the first optical information recording medium, and the optical converging system converges the second light flux having passed through the first region and the n-th order diffracted ray of the second light flux having passed through the second region hrough the second transparent base board onto the second information recording surface so as to conduct reproducing or recording information of the second optical information recording medium.

10. The optical pickup apparatus of claim 9, wherein the optical converging system comprises an objective lens and satisfies the following conditional formula:

NA2<NA1

NA1≦NAH1

(1/3)NA2<NAL1<NA2 where NA1 is a necessary numerical aperture of the objective lens at an optical information recording medium side to be necessary to reproduce or record information of the first optical information recording medium with the first light flux; NA2 is a necessary numerical aperture of the objective lens at an optical information recording medium side to be necessary to reproduce or record information of the second optical information recording medium with the second light flux; NAH11 is a numerical aperture of the objective lens at an optical information recording medium side for the first light flux having passed through at a position of the third region locating farthest from the optical axis; and NAL1 is a numerical aperture of the objective lens at an optical information recording medium side for the first light flux having passed through at a position of the second region locating closest to the optical axis.

11. The optical pickup apparatus of claim 10, wherein the following conditional formula is satisfied:

NA1≦NAH11

(1/2)NA2<NAL1<NA2.

12. The optical pickup apparatus of claim 11, wherein the following conditional formula is satisfied:

0.60≦NAH11

0.3≦NAL1<0.45.

13. The optical pickup apparatus of claim 9, wherein total of a wavefront aberration of the first light flux having passed through the first region, the n-th order diffracted ray of the first light flux having passed through the second region and the m-th order diffracted ray of the first light flux having passed through the third region is 0.07 λ rms or less on the first information recording surface and total of a wavefront aberration of the second light flux having passed through the first region and the n-th order diffracted ray of the second light flux having passed through the second region is 0.07 λ rms or less on the second information recording surface.

14. The optical pickup apparatus of claim 13, wherein total of a wavefront aberration of the second light flux having passed through the first region and the n-th order diffracted ray of the second light flux having passed through the second region and the m-th order diffracted ray of the second light flux having passed through the third region is larger than 0.07 λ rms on the second information recording surface.

15. The optical pickup apparatus of claim 9, wherein the following conditional formula is satisfied:

n≠m.

16. The optical pickup apparatus of claim 15, wherein the following conditional formula is satisfied:

n<m.

17. The optical pickup apparatus of claim 16, wherein the following conditional formula is satisfied:

n=+1 m≧+2.

18. The optical pickup apparatus of claim 9, wherein when an optical path difference function at the second region and the third region is φ(h) where h is a distant from the optical axis, φ(h)/dh becomes discontinuous or substantially discontinuous at a position where h is a predetermined distance h'.

19. The optical pickup apparatus of claim 18, wherein the φ(h)/dh becomes discontinuous or substantially discontinuous at a boundary between the second region and the third region.

20. The optical pickup apparatus of claim 18, wherein the second region an the third region comprises plural ring-shaped diffractive zones and a ring-shaped zone locating at i-th counted from the optical axis to the periphery satisfies the following conditional formula:

1.2≦$(P_{i+1}/m)/(P_i/n)$≦10 where $p_i$ is a width of the ring-shaped zone locating at i-th counted from the optical axis in which the width is a length in a direction perpendicular to the optical axis.

21. The optical pickup apparatus of claim 1, wherein the optical converging system comprises an objective lens and the second region extends to the maximum numerical aperture of the objective lens at an optical information recording medium side when the first light flux is used.

22. The optical pickup apparatus of claim 21, wherein the following conditional formula is satisfied:

NA2<NA1

NA1<NAH1

(2/3)NA2<NAL1<NA1 where NA1 is a necessary numerical aperture of the objective lens at an optical information recording medium side to be necessary to reproduce or record information of the first optical information recording medium with the first light flux; NA2 is a necessary numerical aperture of the objective lens at an optical information recording medium side to be necessary to reproduce or record information of the second optical information recording medium with the second light flux; NAH1 is a numerical aperture of the objective lens at an optical information recording medium side for the first light flux having passed through at a position of the second region locating farthest from the optical axis; and NAL1 is a numerical aperture of the objective lens at an optical information recording medium side for the first light flux having passed through at a position of the second region locating closest to the optical axis.

23. The optical pickup apparatus of claim 22, wherein the following conditional formula is satisfied:

NA1≦NAH1

(4/5)NA2<NAL1<(6/5)NA2.

24. The optical pickup apparatus of claim 23, wherein the following conditional formula is satisfied:

0.60≦NAH1

0.4≦NAL1<0.55.

25. The optical pickup apparatus of claim 21, wherein total of a wavefront aberration of the first light flux having passed through the first region and the n-th order diffracted ray of the first light flux having passed through the second region is 0.07 λ rms or less on the first information recording surface and a wavefront aberration of the second light flux having passed through the first region is 0.07 λ rms or less on the second information recording surface.

26. The optical pickup apparatus of claim 25, wherein total of a wavefront aberration of the second light flux having passed through the first region and the n-th order diffracted ray of the second light flux having passed through the second region is larger than 0.07 λ rms on the second information recording surface.

27. The optical pickup apparatus of claim 1, wherein the following conditional formula is satisfied:

n=+1.

28. The optical pickup apparatus of claim 1, wherein the optical element further comprises a stepped section having a stepped surface being parallel to an optical axis at a boundary between the first region and the second region.

29. The optical pickup apparatus of claim 28, wherein a length of the stepped surface in a direction of the optical axis is set such that a optical path difference caused at the boundary between the first region and the second region by the stepped section is satisfied the following conditional formula:

aλ1−0.2λ1≦ΔL≦aλ1+0.2λ1 bλ2−0.2λ2≦ΔL≦bλ2+0.2λ2 where ΔL is an optical path difference caused at the boundary between the first region and the second region by the stepped section; a is an integer; b is an integer; λ1 is the first wavelength; and λ2 is the second wavelength.

30. The optical pickup apparatus of claim 28, wherein a length of the stepped surface in a direction of the optical axis is 4 μm to 10 μm.

31. The optical pickup apparatus of claim 1, wherein the following conditional formula is satisfied:

λ1<λ2 t1<t2 where λ1 is the first wavelength; λ2 is the second wavelength; t1 is the thickness of the first transparent base board; and t2 is the thickness of the second transparent base board.

32. The optical pickup apparatus of claim 1, wherein the converging optical system comprises an objective lens and the following conditional formula:

NA2<NA1 where NA1 is a necessary numerical aperture of the objective lens at an optical information recording medium side to be necessary to reproduce or record information of the first optical information recording medium with the first light flux and NA2 is a necessary numerical aperture of the objective lens at an optical information recording medium side to be necessary to reproduce or record information of the second optical information recording medium with the second light flux.

33. The optical pickup apparatus of claim 32, wherein the spherical aberration of the second light flux on the second information recording surface at NA1 is 30 μm or more in a direction of the optical axis and the spherical aberration of the second light flux on the second information recording surface at NA2 is 20 μm or less in a direction of the optical axis.

34. The optical pickup apparatus of claim 1, wherein the optical element is a lens.

35. The optical pickup apparatus of claim 34, wherein the lens is an objective lens.

36. The optical pickup apparatus of claim 1, wherein the phase deviation of the wave surface of the first light flux having passed through a boundary between the first region and the second region is (1/10)λ1 or less, where λ1 is the first wavelength.

37. An objective lens for use in an optical pickup apparatus for conducting reproducing or recording information of at least two kinds of optical information recording media, comprising:

a first region including an optical axis; and a second region adjoining the first region and locating at the outside of the first region;

wherein the first region is a refractive surface and the second region is a diffractive surface, when a first light flux having a first wavelength to conduct reproducing or recording information of a first optical information recording medium having a first transparent base board passes through the second region of the objective lens, the light amount of n-th order diffracted ray of the first light flux is larger than that of any other order diffracted ray of the first light flux, and when a second light flux having a second wavelength to conduct reproducing or recording information of a second optical information recording medium passes through the second region of the optical element, the light amount of n-th order diffracted ray of the second light flux is larger than that of any other order diffracted ray of the second light flux, where n is an integer except 0, wherein the objective lens converges the first light flux having passed through the first region and the n-th order diffracted ray of the first light flux having passed through the second region through the first transparent base board onto a first information recording surface of the first optical information recording medium so as to conduct reproducing or recording information of the first optical information recording medium, and the objective lens converges the second light flux having passed through the first region through the second transparent base board onto a second information recording surface of the second optical information recording medium so as to conduct reproducing or recording information of the second optical information recording medium, and wherein the first wavelength is different from the second wavelength and the thickness of the first transparent base board is different from that of the second transparent base board.

38. The objective lens of claim 37, wherein the objective lens comprises a third region adjoining the second region and locating at the outside of the second region and the third region is a refractive surface, and wherein the objective lens converges the first light flux having passed through the first region, the n-th order diffracted ray of the first light flux having passed through the second region and the first light flux having passed through the third region through the first transparent base board onto the first information recording surface so as to conduct reproducing or recording information of the first optical information recording medium, and the objective lens converges the second light flux having passed through the first region and the n-th order diffracted ray of the second light flux having passed through the second region through the second transparent base board onto the second information recording surface so as to conduct reproducing or recording information of the second optical information recording medium.

39. The objective lens of claim 37, wherein the optical element comprises a third region adjoining the second region and locating at the outside of the second region and the third region is a diffractive surface, wherein when the first light flux passes through the third region of the objective lens, the light amount of m-th order diffracted ray of the first light flux is larger than that of any other order diffracted ray of the first light flux, and when the second light flux passes through the third region of the objective lens, the light amount of m-th order diffracted ray of the second light flux is larger than that of any other order diffracted ray of the second light flux, where m is an integer except 0 and is equal to or different from n, and wherein the objective lens converges the first light flux having passed through the first region, the n-th order diffracted ray of the first light flux having passed through the second region and the m-th order diffracted ray of the first light flux having passed through the third region through the first transparent base board onto the first information recording surface so as to conduct reproducing or recording information of the first optical information recording medium, and the objective lens converges the second light flux having passed through the first region and the n-th order diffracted ray of the second light flux having passed through the second region through the second transparent base board onto the second information recording surface so as to conduct reproducing or recording information of the second optical information recording medium.

40. The objective lens of claim 37, wherein the second region extends to a effective most outer periphery of the objective lens.

41. An optical information recording medium recording or reproducing apparatus for conducting reproducing recording information of at least two kinds of optical information recording media, comprising:

the optical pickup apparatus recited in claim 1.

* * * * *

UNITED STATES PATENT AND TRADEMARK OFFICE
CERTIFICATE OF CORRECTION

PATENT NO. : 6,687,209 B2
DATED : February 3, 2004
INVENTOR(S) : Kohei Ota et al.

It is certified that error appears in the above-identified patent and that said Letters Patent is hereby corrected as shown below:

Column 37,
Line 36, "hrough" should read -- through --.
Line 45, "NAH1" should read -- NAH11 --.

Column 38,
Line 46, "an the third region comprises" should read -- and the third region comprise --.

Column 39,
Line 46, "a optical" should read -- an optical --.
Line 48, "is satisfied" should read -- satisfies --.

Column 42,
Line 24, "a effective" should read -- an effective --.
Line 26, "information recording medium recording" should read -- information recording --.
Lines 27-28, "reproducing recording" should read -- reproducing or recording --.

Signed and Sealed this

Twenty-ninth Day of June, 2004

JON W. DUDAS
*Acting Director of the United States Patent and Trademark Office*